US012286074B2

(12) United States Patent
Gordon

(10) Patent No.: US 12,286,074 B2
(45) Date of Patent: *Apr. 29, 2025

(54) LOCKING BOOT FOR VEHICLE WHEEL

(71) Applicant: Mike Gordon, Oceanside, NY (US)

(72) Inventor: Mike Gordon, Oceanside, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/810,747

(22) Filed: Aug. 21, 2024

(65) Prior Publication Data
US 2025/0065840 A1   Feb. 27, 2025

Related U.S. Application Data

(60) Provisional application No. 63/534,653, filed on Aug. 25, 2023.

(51) Int. Cl.
B60R 25/09   (2013.01)

(52) U.S. Cl.
CPC .................... B60R 25/09 (2013.01)

(58) Field of Classification Search
CPC ......... B60R 25/00; B60R 25/09; B60R 25/20; Y10T 70/5841; Y10T 70/40
USPC .......... 70/14, 19, 225, 226; 180/287; 188/32
See application file for complete search history.

(56) References Cited

U.S. PATENT DOCUMENTS

| | | | |
|---|---|---|---|
| 1,376,114 A | 4/1921 | Raney | |
| 1,488,893 A | 4/1924 | Plouffe | |
| 1,793,379 A * | 2/1931 | Snyder | B60P 3/077 188/32 |
| 1,849,964 A * | 3/1932 | Snyder | B60P 3/077 188/32 |

(Continued)

FOREIGN PATENT DOCUMENTS

| | | | | |
|---|---|---|---|---|
| GB | 2435250 A | * | 8/2007 | ............. B60R 25/09 |
| JP | 2002308074 A | | 10/2002 | |
| WO | 9812083 A1 | | 3/1998 | |

OTHER PUBLICATIONS

Article titled "SmartBoots Coming to Salt Lake City Streets", posted on www.KSL.com on Mar. 10, 2011.

(Continued)

Primary Examiner — Suzanne L Barrett
(74) Attorney, Agent, or Firm — Shore IP Group, PLLC; Sean R. Wilsusen

(57) ABSTRACT

A horizontal support arm including a thermoplastic polymer defines a horizontal axis extending along the horizontal support arm. A track is formed in the horizontal support arm. The track extends along the horizontal axis. A first vertical support arm extends from the horizontal support arm. The first vertical support arm includes a front engagement protrusion. The first vertical support arm includes the thermoplastic polymer. A receiving orifice is defined in the horizontal support arm. A horizontal extension portion is slidably received in the receiving orifice by sliding horizontally along the track formed in the horizontal support arm. A second vertical support arm extends from the horizontal extension portion. The second vertical support arm includes a rear engagement protrusion. The second vertical support arm includes the thermoplastic polymer. A lug nut blocking plate extends from the first vertical support arm. The lug nut block plate includes the thermoplastic polymer.

19 Claims, 27 Drawing Sheets

(56) References Cited

U.S. PATENT DOCUMENTS

| | | | | |
|---|---|---|---|---|
| 2,956,646 A * | 10/1960 | Isgren | | B60T 3/00 |
| | | | | 104/259 |
| 2,960,857 A | 11/1960 | Winter | | |
| 3,265,159 A * | 8/1966 | Worden | | B60T 3/00 |
| | | | | 188/32 |
| 3,800,917 A * | 4/1974 | Vick | | B60T 3/00 |
| | | | | 188/32 |
| 3,868,837 A | 3/1975 | Quimby | | |
| 3,907,072 A | 9/1975 | Shafer | | |
| 4,140,206 A * | 2/1979 | Yamazaki | | B60T 3/00 |
| | | | | 188/32 |
| 4,649,724 A * | 3/1987 | Raine | | B60R 25/093 |
| | | | | 70/225 |
| 4,723,426 A | 2/1988 | Beaudoin | | |
| 4,833,442 A | 5/1989 | Heck | | |
| 5,266,378 A * | 11/1993 | Stephenson | | B60T 3/00 |
| | | | | 428/218 |
| 5,315,848 A | 5/1994 | Beyer | | |
| 5,375,442 A | 12/1994 | Hammer | | |
| 5,385,038 A | 1/1995 | Walker | | |
| 5,678,433 A | 10/1997 | Riccitelli | | |
| 5,765,414 A * | 6/1998 | Yu | | B60R 25/0225 |
| | | | | 70/DIG. 49 |
| 5,829,285 A | 11/1998 | Wilson | | |
| 5,862,688 A | 1/1999 | Oedegaard | | |
| 5,865,048 A | 2/1999 | Beavers et al. | | |
| 5,873,275 A | 2/1999 | Lukich | | |
| 6,032,497 A | 3/2000 | Fulcher et al. | | |
| 6,516,642 B1 * | 2/2003 | Vito | | B60R 25/0221 |
| | | | | 70/237 |
| 6,851,523 B1 * | 2/2005 | Gaster | | B60P 3/077 |
| | | | | 188/32 |
| D542,122 S | 5/2007 | Mechalchuk et al. | | |
| D567,062 S | 4/2008 | Meyer | | |
| 7,594,415 B1 | 9/2009 | Wu | | |
| 7,731,088 B2 | 6/2010 | Moynihan et al. | | |
| 7,843,321 B2 | 11/2010 | Marchasin et al. | | |
| 7,950,570 B2 | 5/2011 | Marchasin et al. | | |
| 7,988,046 B2 | 8/2011 | Moynihan et al. | | |
| 8,099,984 B2 | 1/2012 | Wu | | |
| 8,219,442 B2 | 7/2012 | Johnson et al. | | |
| 9,262,749 B2 | 2/2016 | Johnson et al. | | |
| 9,963,105 B1 * | 5/2018 | Gordon | | B60R 25/20 |
| 10,507,792 B1 * | 12/2019 | Gordon | | G06Q 30/0276 |
| 10,696,270 B2 * | 6/2020 | Gordon | | B60R 25/20 |
| 10,696,271 B1 * | 6/2020 | Gordon | | G06Q 30/0609 |
| 10,829,087 B2 * | 11/2020 | Gordon | | B60R 25/09 |
| 11,661,030 B2 * | 5/2023 | Gordon | | B60R 25/20 |
| | | | | 70/226 |
| 11,745,704 B2 * | 9/2023 | Barattini | | B60T 3/00 |
| | | | | 188/32 |
| 11,772,602 B2 * | 10/2023 | Gordon | | G06Q 30/0609 |
| | | | | 70/226 |
| 11,794,692 B1 * | 10/2023 | Gordon | | B60R 25/09 |
| 11,884,234 B2 * | 1/2024 | Gordon | | B60R 25/20 |
| 2001/0040072 A1 * | 11/2001 | Scheffer | | B60T 3/00 |
| | | | | 188/32 |
| 2007/0245783 A1 | 10/2007 | Fulcher et al. | | |
| 2009/0188284 A1 | 7/2009 | Mechalchuk | | |
| 2010/0108448 A1 | 5/2010 | Wyers | | |
| 2011/0083481 A1 | 4/2011 | Cheatham | | |
| 2011/0226022 A1 | 9/2011 | Caldwell | | |
| 2012/0215595 A1 | 8/2012 | Johnson et al. | | |
| 2012/0215596 A1 | 8/2012 | Johnson et al. | | |
| 2012/0260702 A1 | 10/2012 | Jones | | |
| 2013/0226795 A1 | 8/2013 | Hopper et al. | | |
| 2019/0202403 A1 | 7/2019 | Taljaard | | |
| 2020/0216020 A1 | 7/2020 | Gordon | | |

OTHER PUBLICATIONS

File History for Ex-Parte Reexamination No. 90/014,183.

Paylock Modern Parking Solutions and Smart Boot, "Smartbooting" https://paylock.com/ [Last Visited Oct. 29, 2024].

Product information webpage for Coochleer Car Wheel Lock Anti Theft Tire Lock Clamp Boot Tire Claw Parking Car Truck RV Boat Trailer: Automotive, accessed Aug. 1, 2018 at :https://www.amazon.com/dp/B0725RFVTK/ref=sspa_dk_detail_2?psc=1&pd_rd_i=B0725RFVTK&pd_rd_wg=R4Mzl&pd_rd_r=H56CCZ90T4WP1BE97H3D&pd_rd_w=5KEc5, referencing a "Date First Available" of Apr. 13, 2017.

Product information webpage for Heavy Duty Wheel Lock, accessed via Internet archive: Wayback Machine (https://archive.org/web/) for http://www.equipment lock.com as publicaly viewable on May 4, 2012.

Product User Manual for Fullstop Security Centurian Wheel Clamp, Model FCWC10-7, Rev. B 07-07, copyright 2007.

Mophorn, Wheel Lock Clamp Boot Tire,Date first available Aug. 31, 2017, [online]retrieved Mar. 1, 2021, available from https://www.amazon.com/Mophorn-Wheel-Clamp-Heavy-Duty-Parking/dp/B07589TJW1/ref=psdc_15706751_t2_B08HWYDQCZ (Year: 2017).

Oklead,Anti Theft Trailer Wheel Lock Clamp, Date first available May 22, 2019, [online]retrieved Mar. 1, 2021, available from https://www.amazon.com/OKLEAD-Theft-Trailer-Wheel-Clamp/dp/B07RZY621W/ref=psdc_15706751_t4_B01MZF0252 (Year: 2019).

OxGord Store, Trailer Wheel Lock, Date first available Jun. 9, 2017, [online]retrieved Mar. 1, 2021, available from https://www.amazon.com/OxGord-Heavy-Automotive-Towing-Trailer/dp/B071JZNKC2/ref=sr_1_2?dchild=1&keywords=Clamp+Wheel+Chock+Lock& (Year: 2017).

* cited by examiner

LOCKING BOOT FOR VEHICLE WHEEL

CROSS-REFERENCE TO RELATED APPLICATION

The present non-provisional patent application claims priority to U.S. Provisional Patent Application No. 63/534,653, filed on Aug. 25, 2023, the entire contents of which are incorporated by reference herein.

FIELD

The present disclosure relates to a locking boot and, more particularly, to a locking boot for a vehicle wheel.

BACKGROUND

Parking enforcement often involves the use of identifying one or more vehicles illegally occupying a particular parking space or area and towing said vehicle. Further, vehicle tags registered to an owner who owed substantial fees in unpaid parking tickets. Fines may be increased substantially for repeat violators who are termed scofflaws. Scofflaws may be individuals who repeatedly violate a summons. Thus, vehicles registered to such owners may be towed to a storage location until back fines are paid the towed vehicle is replaced. An alternative approach is to utilize a vehicle locking boot which attaches to a vehicle's wheel and will prevent said vehicle from being moved until any related back fines are paid.

A vehicle locking boot may be applied to at least one wheel of a vehicle registered to a scofflaw or to a vehicle parked in an illegal area. The vehicle locking boot may eliminate the need to tow the vehicle, which saves time and money for both the vehicle owner and the municipality in which the vehicle is located. Such vehicle locking boots may be released after a fine is paid and the released vehicle locking boot may be returned to a management company without the vehicle ever being towed.

SUMMARY

Provided in accordance with aspects of the present disclosure is a vehicle locking boot including a horizontal support arm. The horizontal support arm defines a horizontal axis extending along the horizontal support arm. The horizontal support arm includes a thermoplastic polymer. A track is formed in the horizontal support arm. The track extends along the horizontal axis defined by the horizontal support arm. A first vertical support arm extends from the horizontal support arm along a direction orthogonal to an upper surface of the horizontal support arm. The first vertical support arm includes a front engagement protrusion extending therefrom. The first vertical support arm includes the thermoplastic polymer. A receiving orifice is defined in the horizontal support arm and extends along a direction parallel to an extending direction of the horizontal support arm. A horizontal extension portion is coupled to the track formed in the horizontal support arm. The horizontal extension portion is slidably received in the receiving orifice by sliding horizontally along the track formed in the horizontal support arm. A second vertical support arm extends from the horizontal extension portion along the direction orthogonal to the upper surface of the horizontal support arm. The second vertical support arm includes a rear engagement protrusion extending therefrom. The second vertical support arm includes the thermoplastic polymer. A lug nut blocking plate extends from the first vertical support arm above the front engagement protrusion. The lug nut block plate includes the thermoplastic polymer.

In an aspect of the present disclosure, a first rear surface is defined by the first vertical support arm. A second rear surface is defined by the lug nut blocking plate. A number of first interconnected support walls extend along a direction orthogonal to the first rear surface of the first vertical support arm. The first interconnected support walls are configured to increase a rigidity of the first vertical support arm. A number of second interconnected support walls extend along a direction orthogonal to the second rear surface of the lug nut blocking plate. The second interconnected support walls are configured to increase a rigidity of the lug nut blocking plate.

In an aspect of the present disclosure, the horizontal support arm, the first vertical support arm, and the luck nut block plate are a single integrally formed structure.

In an aspect of the present disclosure, the thermoplastic polymer is polycarbonate or polypropylene.

In an aspect of the present disclosure, the thermoplastic polymer includes discontinuous carbon fibers, nylon, or fiberglass.

In an aspect of the present disclosure, the second vertical support arm includes a base member connected with the horizontal extension portion and a vertical extension portion supporting the rear engagement protrusion. The base member defines a first width greater than a second width defined by the vertical extension portion.

In an aspect of the present disclosure, the base member of the second vertical support arm defines a first angled sidewall, a second angled sidewall, and a third angled sidewall.

In an aspect of the present disclosure, the base member includes a first vertical sidewall extending from the first angled sidewall, a second vertical sidewall extending form the second angled sidewall, and a third vertical sidewall extending from the third angled sidewall.

In an aspect of the present disclosure, the first vertical support arm includes a vertical extension portion, a first angled sidewall extending between the horizontal support arm and the vertical extension portion, and a second angled sidewall extending between the lug nut blocking plate and the vertical extension portion.

In an aspect of the present disclosure, a recess is defined in the first vertical support arm. The recess is defined by a first inner sidewall of the first vertical support arm and a second inner sidewall of the first vertical support arm. A keypad assembly is arranged in the recess defined in the first vertical support arm. The keypad assembly defines a first outward facing sidewall configured to face the first inner sidewall of the first vertical support arm. The keypad assembly defines a second outward facing sidewall configured to face the second inner sidewall of the first vertical support arm.

In an aspect of the present disclosure, a compartment is defined in the first vertical support arm. The compartment is configured to house a global positioning system module. A compartment cover is configured to be removably coupled with the lug nut blocking plate or the first vertical support arm to close the compartment.

In an aspect of the present disclosure, at least two orifices are formed in a wall of the compartment. At least two projections extend from the compartment cover. Each projection is configured to be received in a corresponding orifice to prevent lateral movement of the compartment cover with respect to the compartment.

In an aspect of the present disclosure, the lug nut blocking plate includes a lug nut blocking pad disposed on lug nut blocking plate.

In an aspect of the present disclosure, the lug nut locking plate defines an octagonal shape.

In an aspect of the present disclosure, the horizontal extension portion is configured to slide along the track to move the rear engagement protrusion to varying distances from the front engagement protrusion.

In an aspect of the present disclosure, the first vertical support arm forms a 90° angle with the horizontal support arm.

In an aspect of the present disclosure, the front engagement protrusion faces the rear engagement protrusion.

In an aspect of the present disclosure, the front engagement protrusion is substantially horizontally aligned with the rear engagement protrusion.

In an aspect of the present disclosure, a keypad is disposed in the first vertical support arm.

In an aspect of the present disclosure, the horizontal extension portion is configured to slide horizontally along the track below the first vertical support arm.

BRIEF DESCRIPTION OF THE DRAWINGS

Various aspects and features of the present disclosure are described hereinbelow with reference to the drawings wherein.

DETAILED DESCRIPTION

Figure 1:
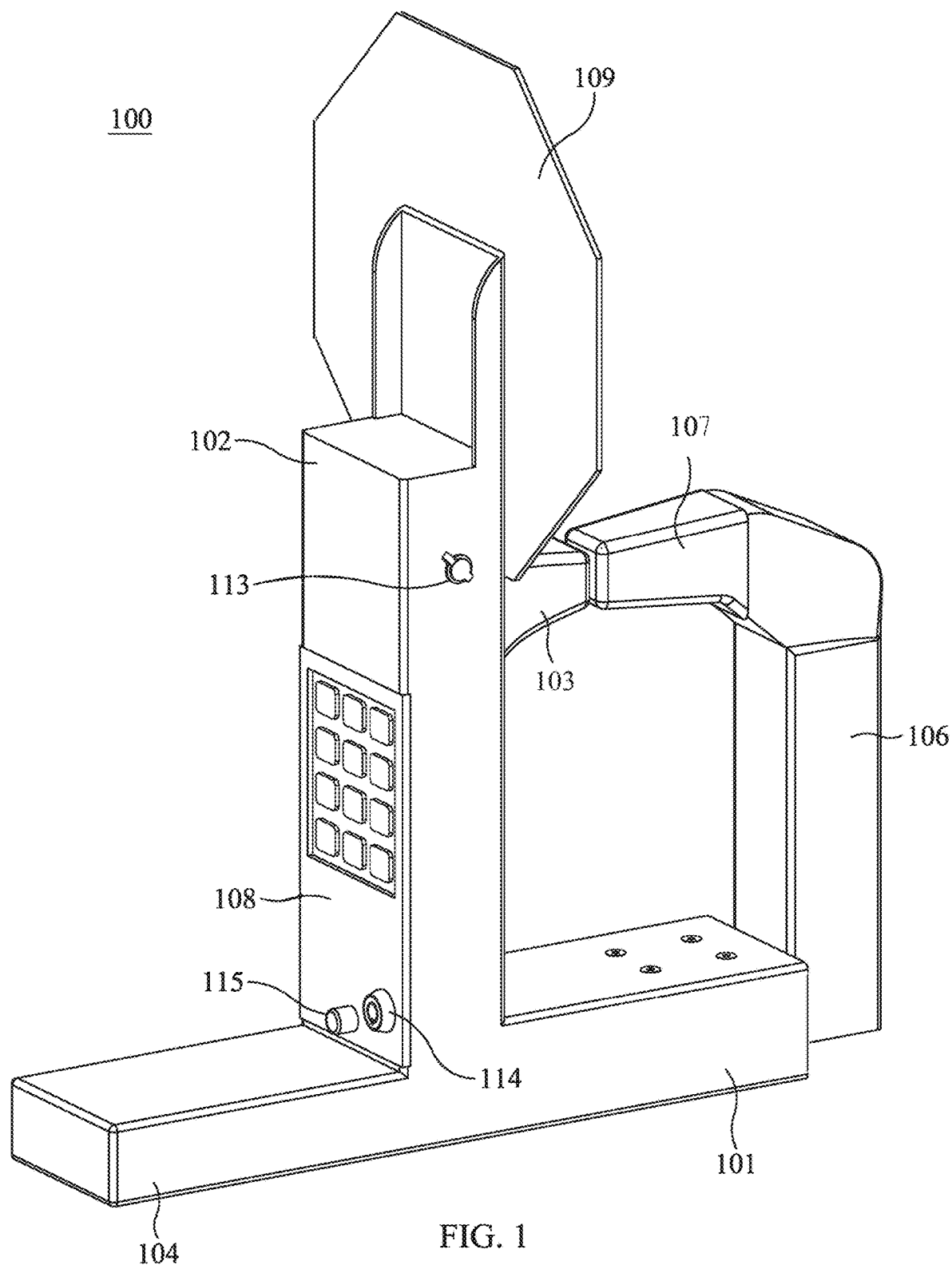
FIG. 1 illustrates an angled side view of a vehicle locking boot according to an aspect of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

Figure 2:
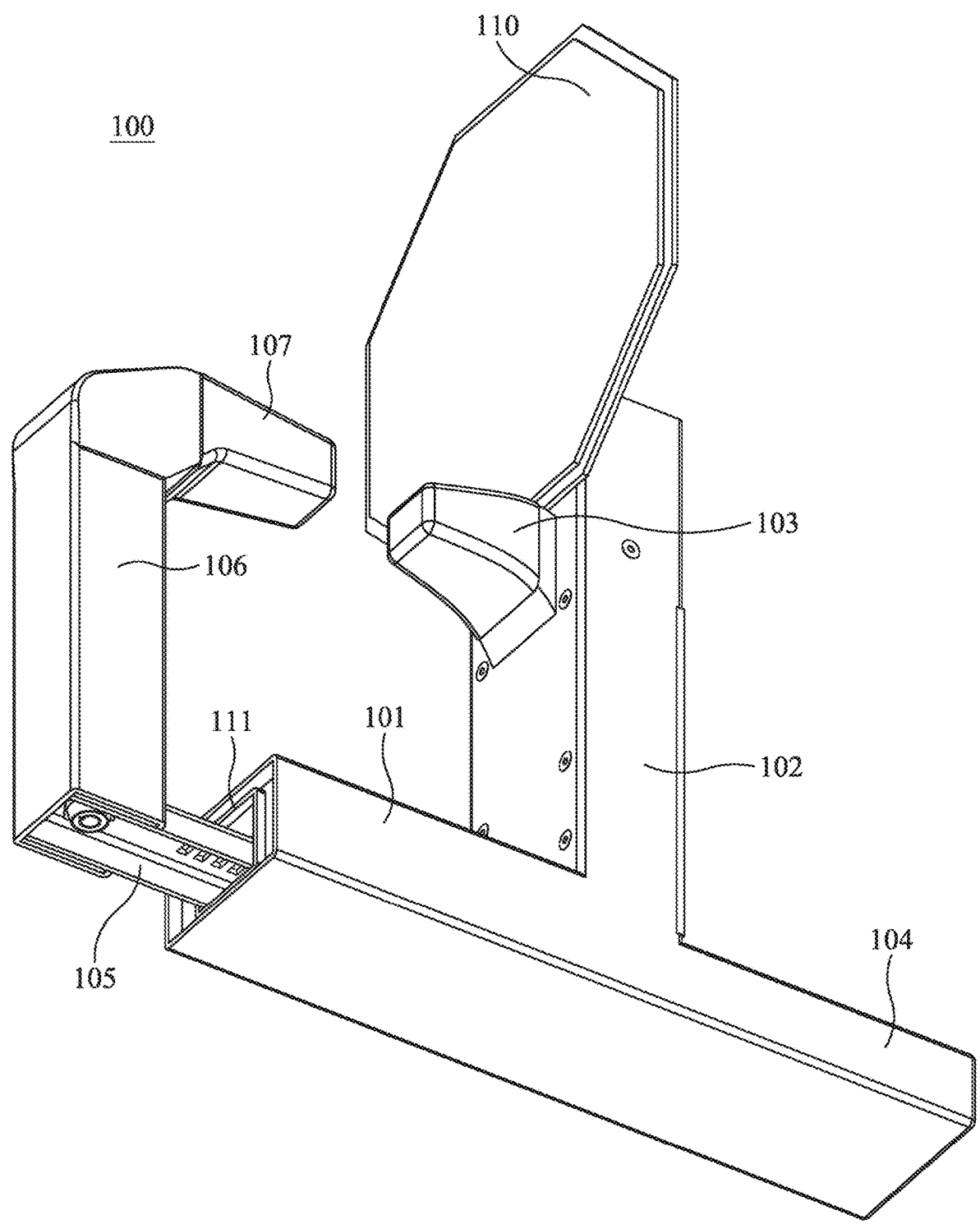
FIG. 2 illustrates an angled side view of a vehicle locking boot according to an aspect of the present disclosure.
Figure 3:
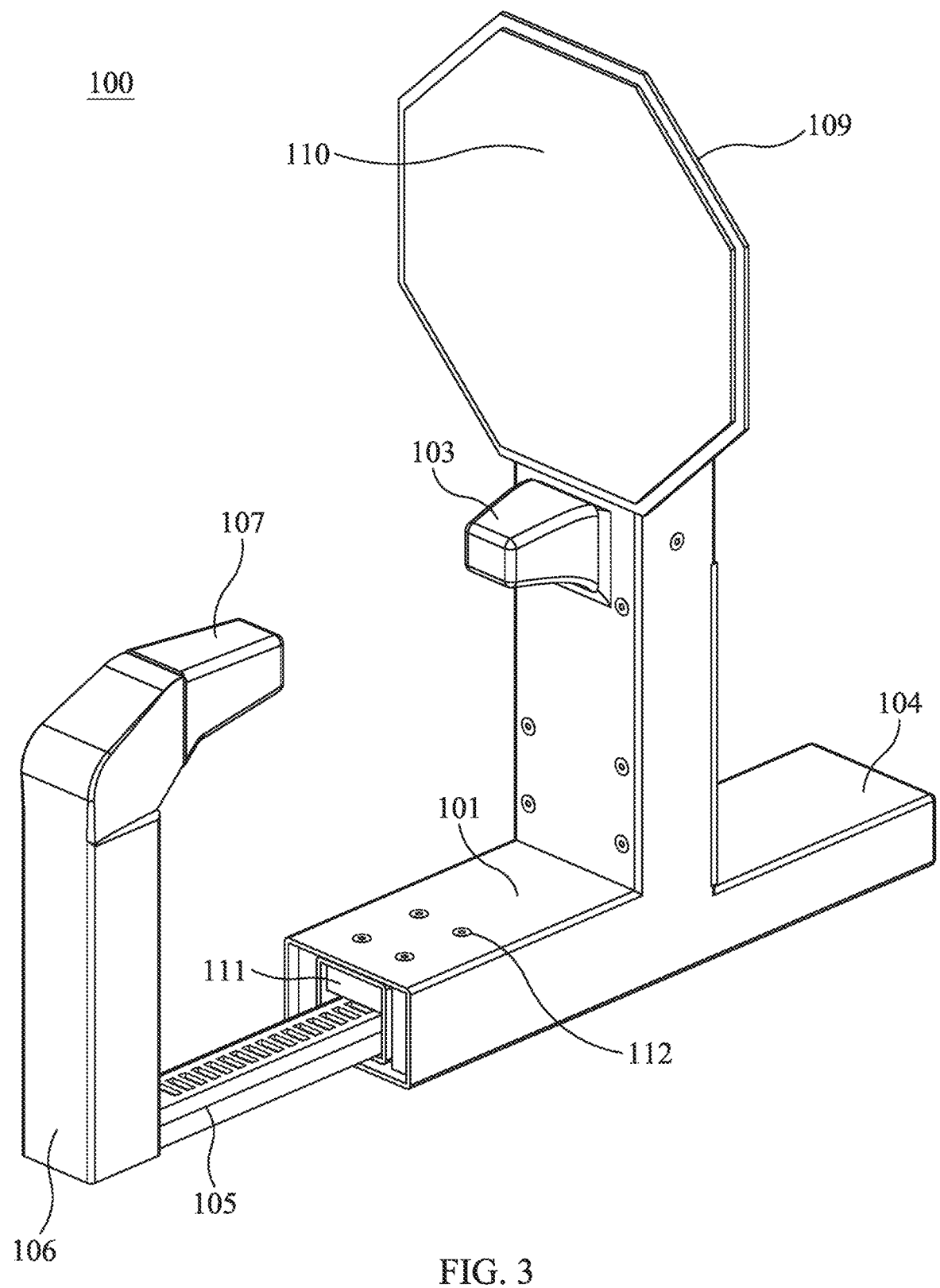
FIG. 3 illustrates an angled side view of a vehicle locking boot according to an aspect of the present disclosure.
Figure 4:
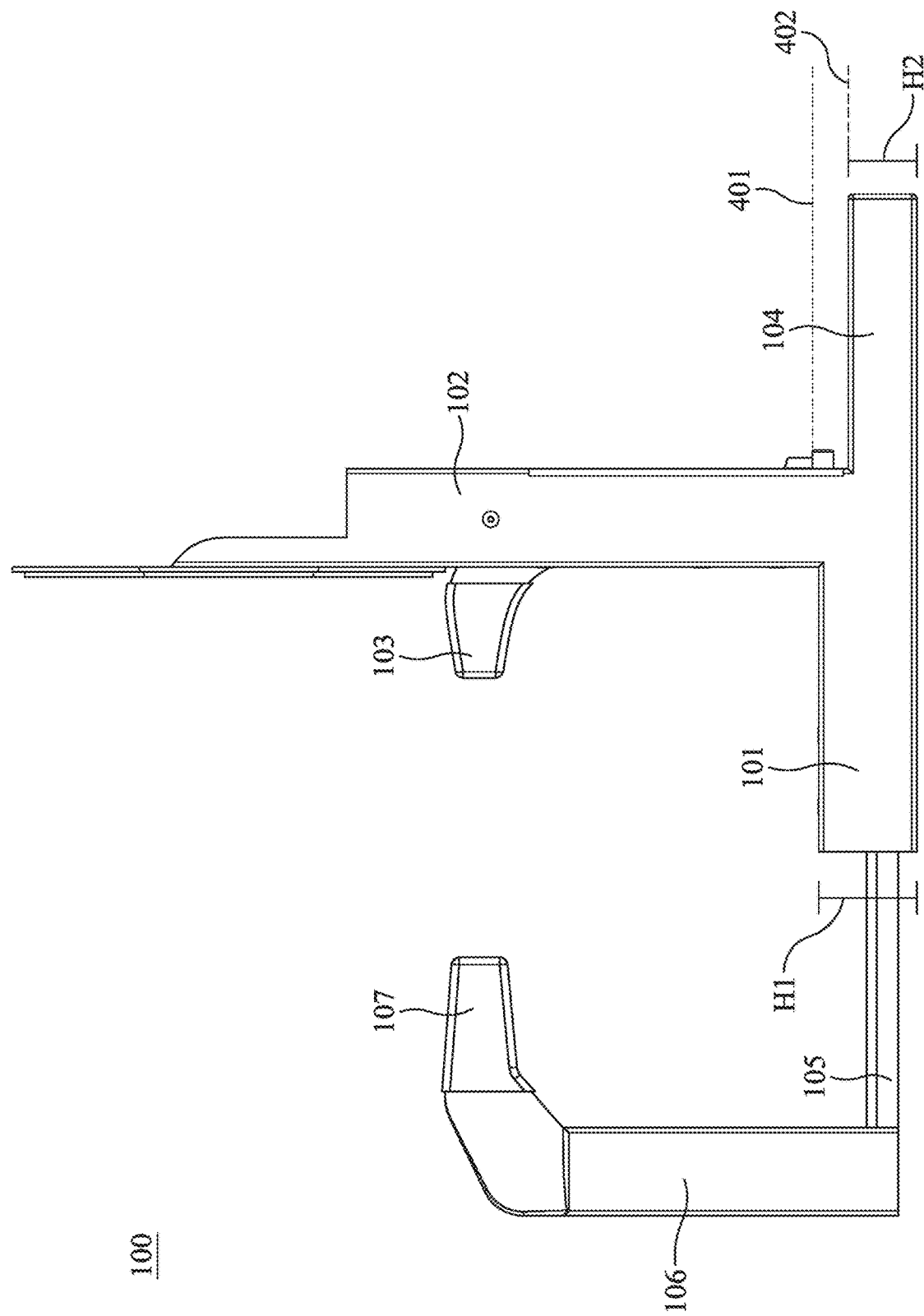
FIG. 4 illustrates a side view of a vehicle locking boot according to an aspect of the present disclosure.
Figure 5:
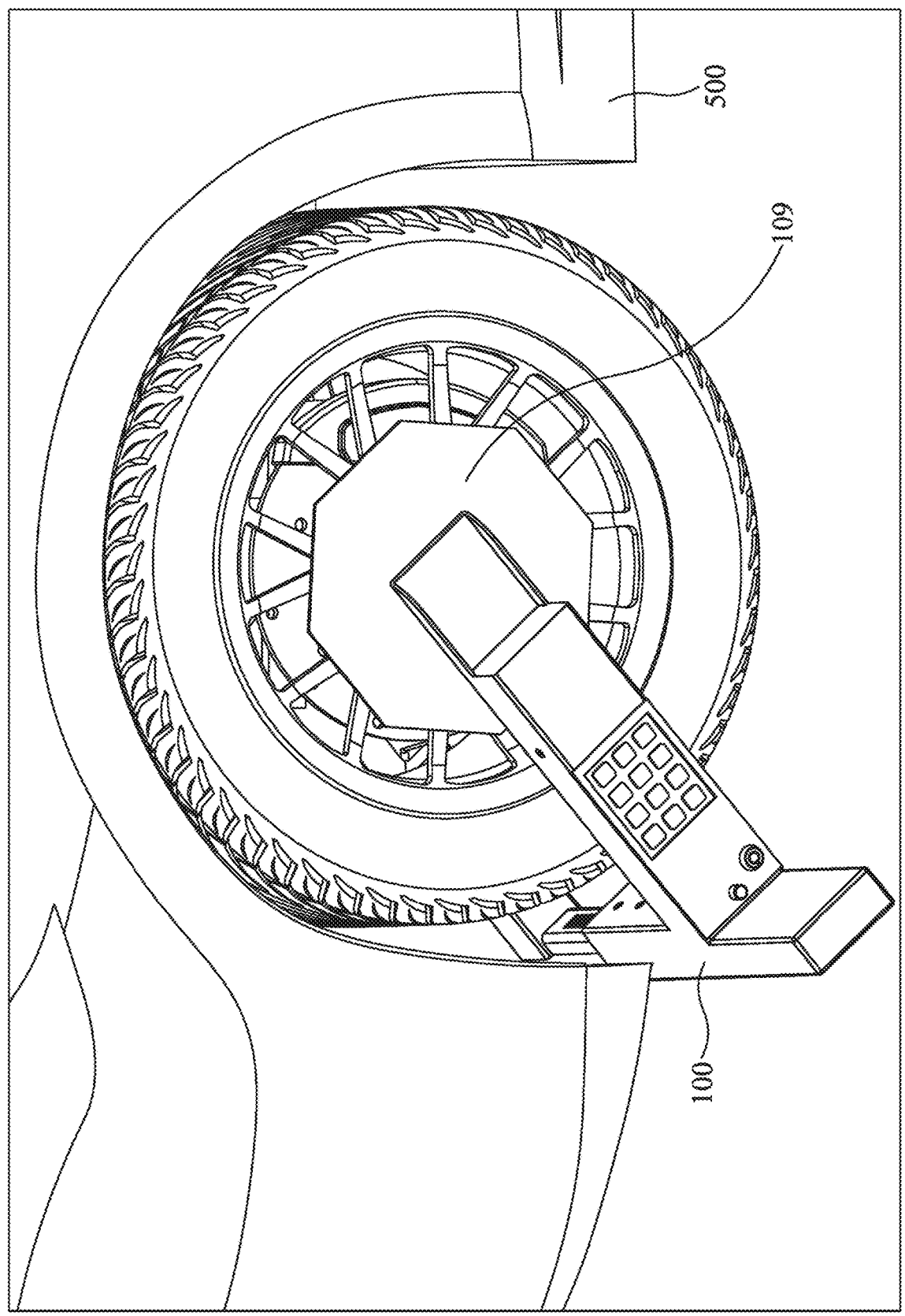
FIG. 5 illustrates a view of a vehicle locking boot according to an aspect of the present disclosure.

FIG. 1 illustrates an angled side view of a vehicle locking boot according to an exemplary embodiment of the present invention. FIG. 2 illustrates an angled side view of a vehicle locking boot according to an exemplary embodiment of the present invention FIG. 3 illustrates an angled side view of a vehicle locking boot according to an exemplary embodiment of the present invention. FIG. 4 illustrates a side view of a vehicle locking boot according to an exemplary embodiment of the present invention. FIG. 5 illustrates a view of a vehicle locking boot according to an exemplary embodiment of the present invention coupled to a vehicle wheel.

Referring to FIGS. 1 to 5, according to an exemplary embodiment of the present invention, a vehicle locking boot 100 may include an oversized lug nut blocking plate (e.g., a lug nut blocking plate 109) and pad (e.g., a lug nut blocking pad 110). The lug nut blocking plate 109 and pad 110 may be approximately ten inches in diameter and may have a substantially octagonal shape. Thus, the lug not blocking plate 109 and pad 110 may be dimensioned, shaped and positioned to prevent tampering with the vehicle locking boot 100 by preventing lug nuts of a locked vehicle (e.g., vehicle 500) from being removed.

According to an exemplary embodiment of the present invention, a vehicle locking boot 100 may include relatively wide front and rear engagement protrusions (e.g., a front engagement protrusion 103 and a rear engagement protrusion 107) configured to be inserted into inner and outer indentations of a wheel. The engagement protrusions may be approximately two inches in diameter and may taper to approximately one inch in diameter at innermost points of the engagement protrusions which face each other at an inner portion of a wheel (e.g., approximately behind the lug nuts of the vehicle). Upward projecting support arms (e.g., a first vertical support arm 102 and a second vertical support arm 106) of each of the engagement protrusions (the engagement protrusions may project horizontally) and the engagement protrusions may be formed as a single continuous member without weld joints. Thus, the engagement protrusions may be substantially rigid such that they cannot be easily tampered with or broken away from the vehicle locking boot through an application of force to the engagement protrusions or corresponding support arms.

The support arms and the engagement protrusions may be dimensioned, shaped and positioned such that tips of the engagement protrusions come into contact with each other when the vehicle locking boot 100 is fully closed, and the engagement protrusions may become separated from each other when the vehicle locking boot 100 is opened (e.g., to lock the vehicle locking boot to a wheel). However, dimensions of a wheel to which the vehicle locking boot 100 is attached may vary, and thus the engagement protrusions may be separated from each other even when the vehicle locking boot 100 is locked to a wheel of a vehicle.

A first engagement protrusion (e.g., a front engagement protrusion 103) coupled to a first vertical support arm (e.g., a first vertical support arm 102) opposite the lug nut blocking plate 109 may be moved away from a second engagement protrusion (e.g., a rear engagement protrusion 107) coupled to a second vertical support arm (e.g., a second vertical support arm 106) immediately below the lug nut blocking plate 109 by way of a horizontal extension portion coupled to the first vertical support arm. The horizontal extension portion may slide through a track immediately below the second vertical support arm. The horizontal extension portion 105 may move in and out of a receiving sleeve 104 which is fully enclosed and is positioned approximately below the lug nut blocking plate 109. Thus, a distal end of the horizontal extension portion 105 is not exposed to an outside of the vehicle locking boot, which may prevent damage to the horizontal extension portion, and may reduce an amount of maintenance (e.g., greasing and cleaning) of the horizontal extension portion and the track. An upper surface of the receiving sleeve 104 may be in a different horizontal plane (e.g., a first horizontal plane 401) than an upper surface of a horizontal support arm (e.g., a horizontal support arm 101) coupled to the second vertical support arm (e.g., a second vertical support arm 106) on an opposite side of the second vertical support arm from the horizontal support arm 101. For example, an upper surface of the receiving sleeve 104 may be below the upper surface of the horizontal support arm 101, which may reduce a size and weight of the overall vehicle locking boot, while still protecting the horizontal extension portion.

According to an exemplary embodiment of the present invention, the first vertical support arm may form substantially a ninety degree angle with the horizontal support arm.

The vehicle locking boot may be unlocked and removed by entering a code into keypad, unlocking the boot, and sliding the engagement protrusions away from each other to remove the vehicle locking boot from the wheel.

According to an exemplary embodiment of the present invention, the vehicle locking boot 100 may be formed of steel or another rigid metal and may include a relatively small number of weld joints, which may prevent one or more portions of the vehicle locking boot from being tampered with or broken off through an application of force. For example, each of the support arms described herein may have a hollow, tubular steel structure to maximize strength, while minimizing weight, thus allowing the vehicle locking boot 100 described herein to be easily locked to a vehicle's wheel without being damaged or broken off through an application of mechanical force or through tampering with by an owner of a vehicle.

According to an exemplary embodiment of the present invention, the vehicle locking boot 100 may include countersunk screws 112, a charging port 113 for charging to key pad 108 or any other connected electronic devices, a lock 114 and a release button 115 for releasing the lock 114 when the release button 115 is depressed after a correct unlock code is entered into the keypad 108.

According to an exemplary embodiment of the present invention, a vehicle locking boot 100 includes a horizontal support arm 101 and a first vertical support arm 102 extending from the horizontal support arm 101 along a direction orthogonal to an upper surface the horizontal support arm 101. The first vertical support arm 102 includes a front engagement protrusion 103 extending therefrom. A receiving sleeve 104 extends from the horizontal support arm at a base of the first vertical support arm 102 along a direction parallel to an extending direction of the horizontal support arm 101. A horizontal extension portion 105 is coupled to the horizontal support arm 101. A second vertical support arm 106 extends from the horizontal extension portion 105 along the direction orthogonal to the upper surface of the horizontal support arm 101. The second vertical support arm 106 includes a rear engagement protrusion 107 extending therefrom. The front engagement protrusion 103 faces the rear engagement protrusion 107. A keypad 108 is disposed on the first vertical support arm 102. The keypad 108 is configured to lock and unlock the horizontal extension portion 105. A lug nut blocking plate 109 is coupled to the first vertical support arm 102 above the front engagement protrusion 103.

According to an exemplary embodiment of the present invention, the lug nut blocking plate 109 may include a lug nut blocking pad 110 disposed on lug nut blocking plate. The lug nut blocking pad 110 may be a foam or rubber pad having substantially a same size and shape as the lug nut blocking plate 109 to protect a vehicle (e.g., vehicle 500) wheel from damage.

According to an exemplary embodiment of the present invention, the lug nut blocking plate 109 may have an octagonal shape, which may prevent the lug nuts from being accessed or tampered with.

According to an exemplary embodiment of the present invention, the horizontal extension portion 105 may be coupled to an internal track 111 formed in the horizontal support arm. The horizontal extension portion 105 may be configured to slide along the internal track 111 to move the rear engagement protrusion 107 to varying distances from the front engagement protrusion 103.

According to an exemplary embodiment of the present invention, a distal end of the horizontal extension portion 105 with respect to the second vertical support arm 106 may be concealed within the receiving sleeve 104 when the front engagement protrusion 103 is in contact with the rear engagement protrusion 107.

According to an exemplary embodiment of the present invention, the horizontal support arm 101 may have a first thickness (e.g., first thickness H1 illustrated in FIG. 4) along the direction orthogonal to the upper surface of the horizontal support arm 101. The receiving sleeve 104 may have a second thickness (e.g., second thickness H2 illustrated in FIG. 4) along the direction orthogonal to the upper surface of the horizontal support arm 101. The second thickness may be less than the first thickness.

According to an exemplary embodiment of the present invention, the upper surface of the horizontal support arm 101 may extend along a first horizontal plane (e.g., first horizontal plane 401 illustrated in FIG. 4). An upper surface of the receiving sleeve may extend along a second horizontal plane (e.g., second horizontal plane 402 illustrated in FIG. 4). The first horizontal plane may be spaced apart from the second horizontal plane along the direction orthogonal to the upper surface of the horizontal support arm 101.

According to an exemplary embodiment of the present invention, the first vertical support arm 102 may form a 90° angle with the horizontal support arm 101.

According to an exemplary embodiment of the present invention, a diameter of the lug nut blocking plate 109 may be at least 10 inches. Thus, the lug nut blocking pad 110 may be relatively large to prevent access to and tampering with the underlying lug nuts.

According to an exemplary embodiment of the present invention, a diameter of each of the front engagement protrusion 103 at a first end of the front engagement protrusion 103 opposite the rear engagement protrusion 107 may be at least 2 inches. A diameter of the rear engagement protrusion 107 may taper to 1 inch at a second end of the front engagement protrusion 103 facing the rear engagement protrusion 107.

Figure 6:
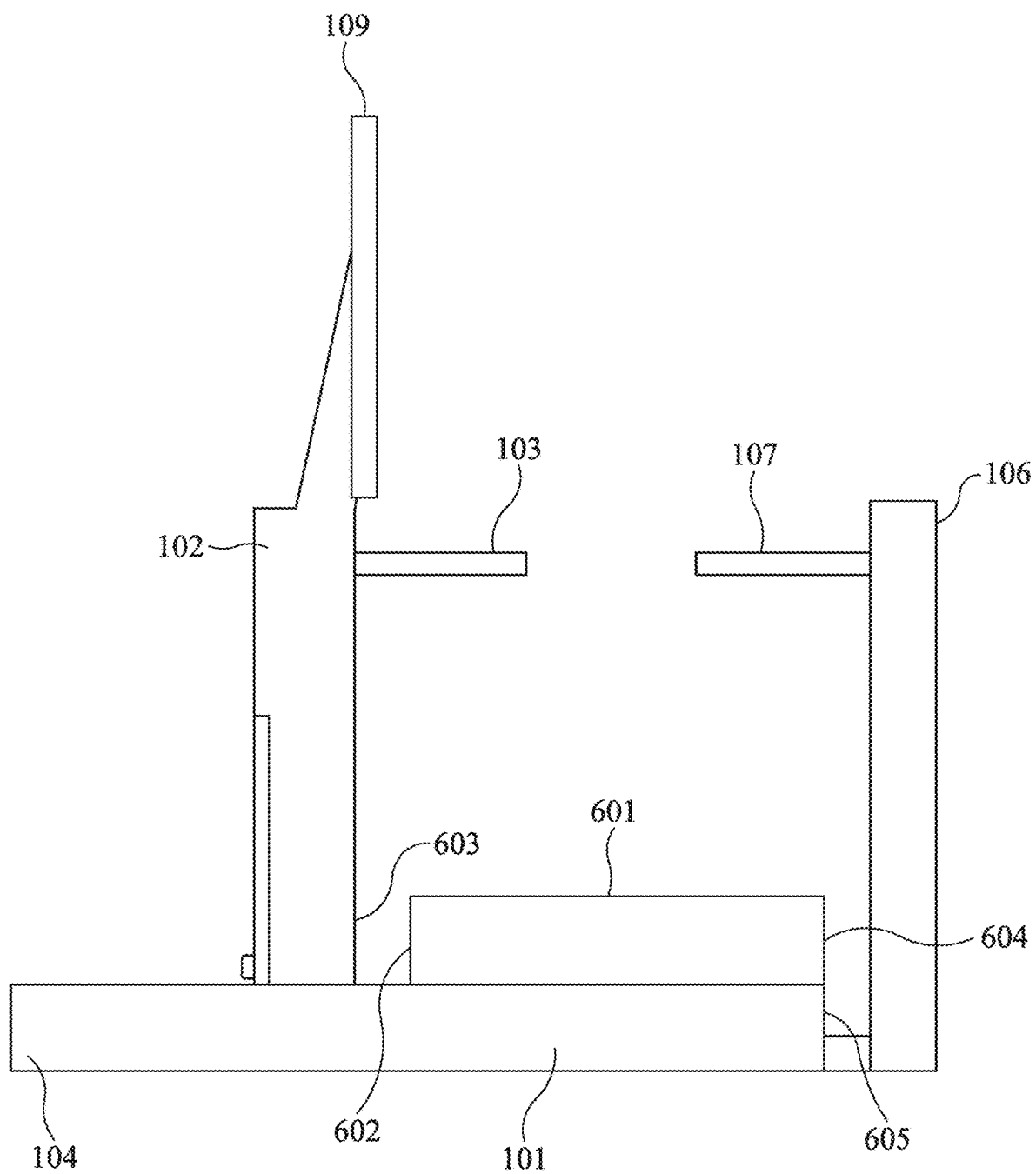
FIG. 6 illustrates a side view of a vehicle locking boot according to an aspect of the present disclosure.
Figure 7:
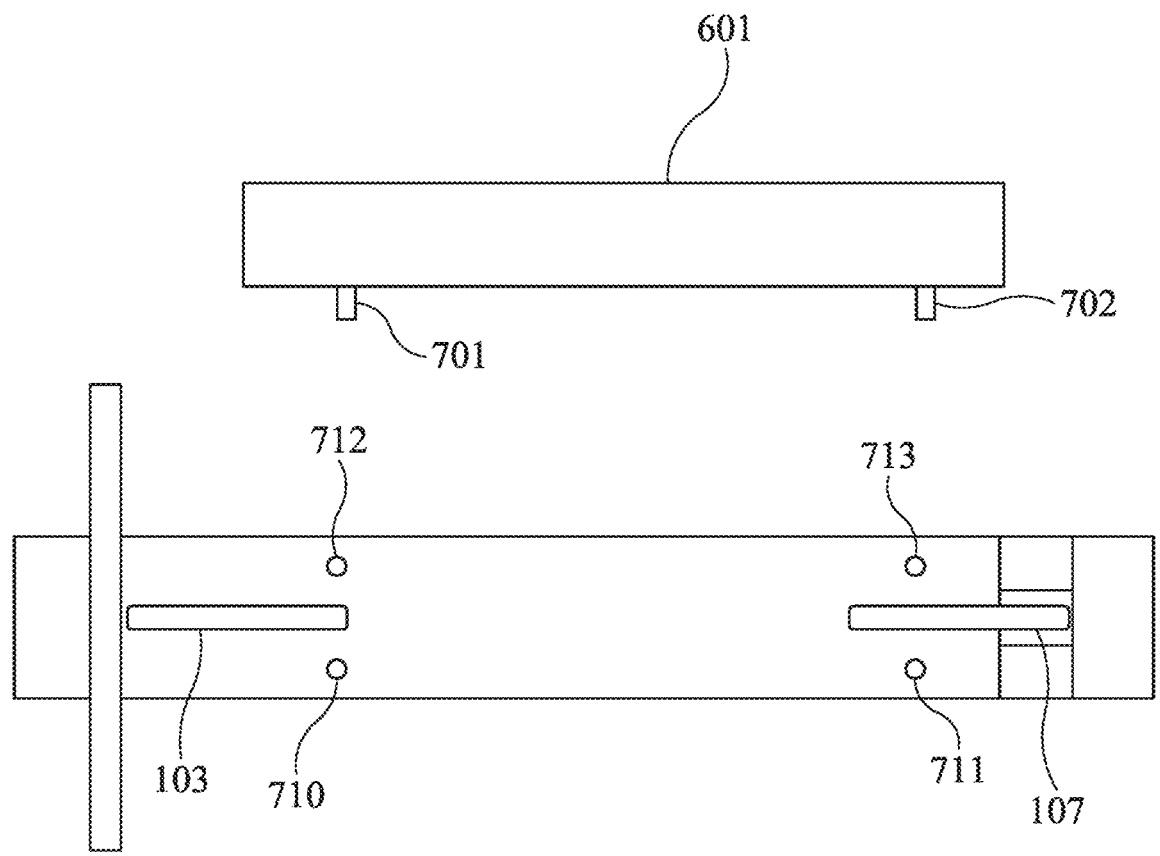
FIG. 7 illustrates a top down view of a vehicle locking boot and a spacer configured to be coupled to the vehicle locking boot according to an aspect of the present disclosure.
Figure 8:
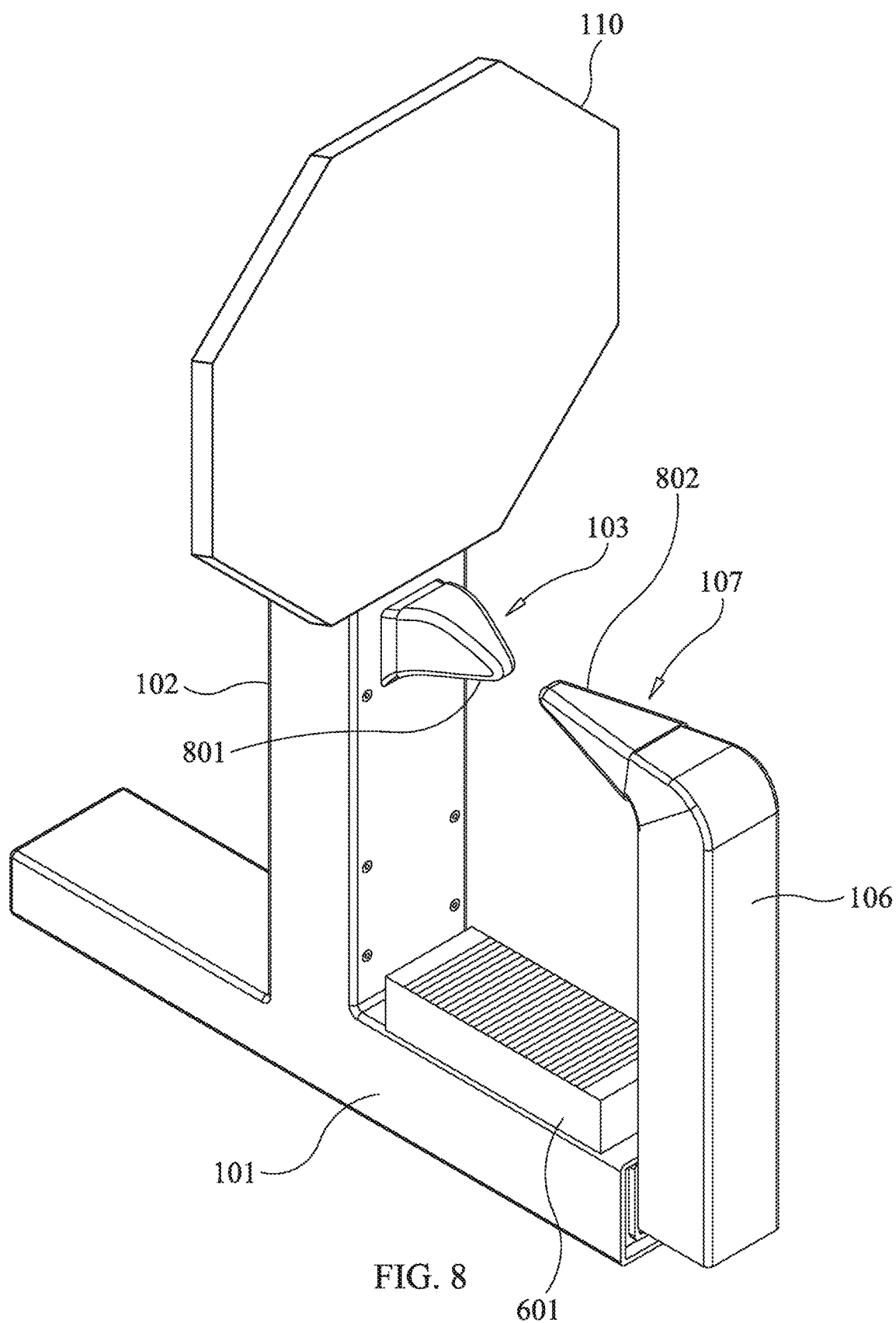
FIG. 8 illustrates an angled side view of a vehicle locking boot according to an aspect of the present disclosure.
Figure 9:
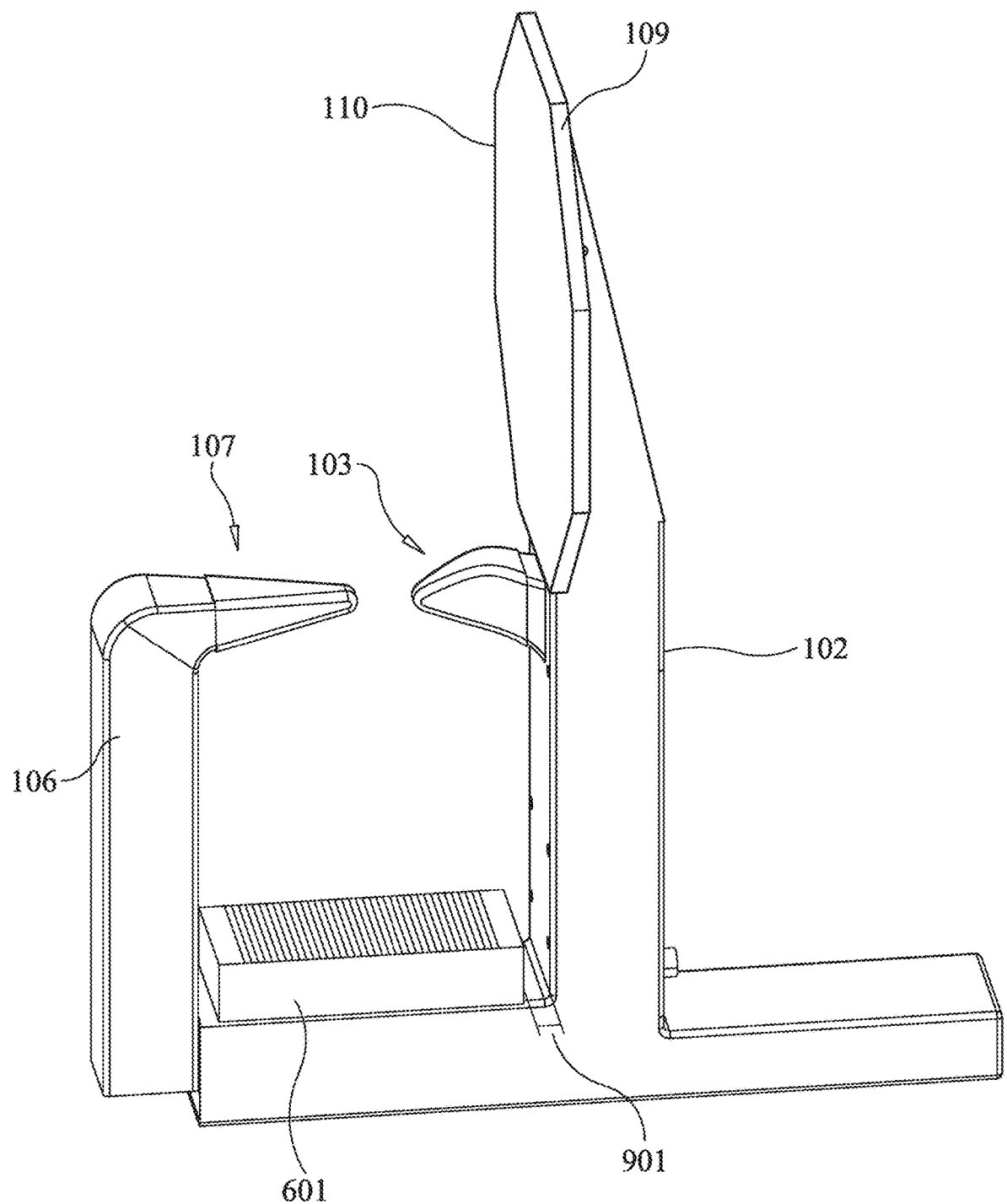
FIG. 9 illustrates an angled side view of a vehicle locking boot according to an aspect of the present disclosure.
Figure 10:
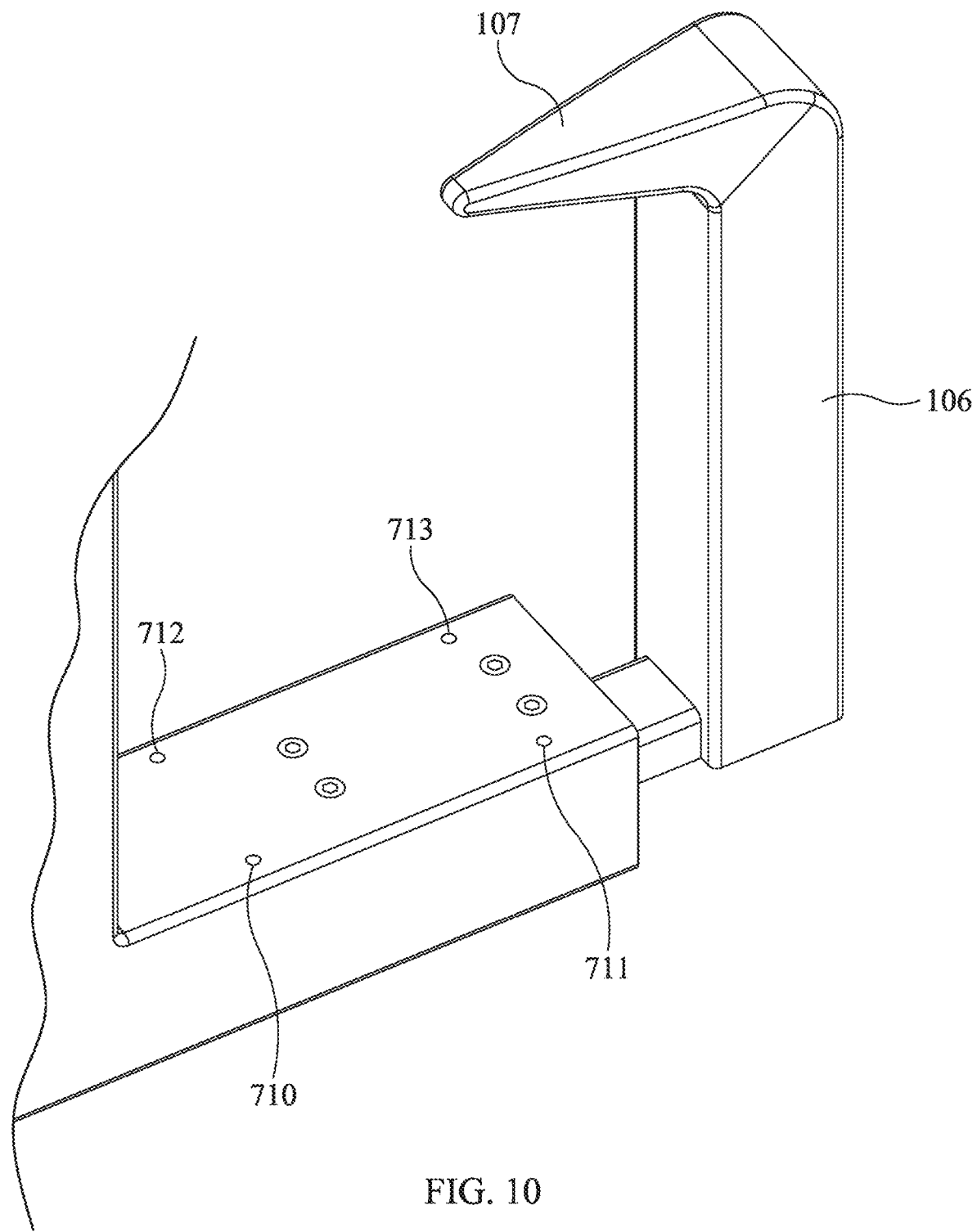
FIG. 10 illustrates an exemplary front engagement protrusion of a vehicle locking boot according to an aspect of the present disclosure.
Figure 11:
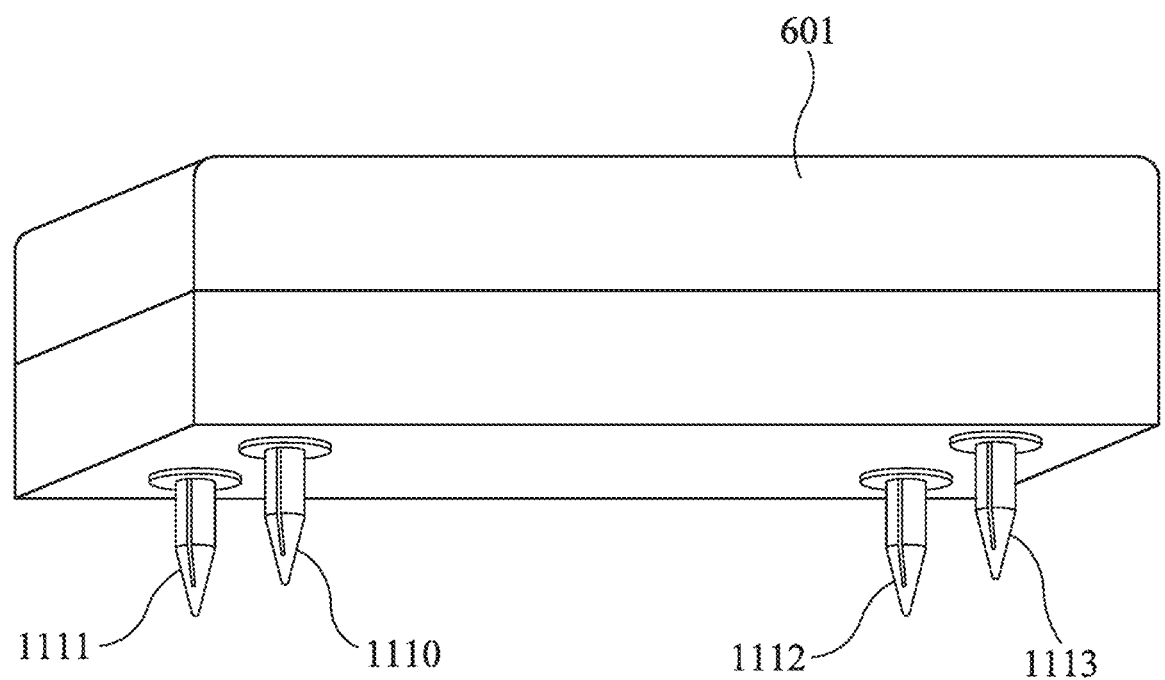
FIG. 11 illustrates an exemplary spacer of a vehicle locking boot according to an aspect of the present disclosure.

FIG. 6 illustrates a side view of a vehicle locking boot according to an exemplary embodiment of the present invention. FIG. 7 illustrates a top down view of a vehicle locking boot and a spacer configured to be coupled to the vehicle locking boot according to an exemplary embodiment of the present invention. FIG. 8 illustrates an angled side view of a vehicle locking boot according to an exemplary embodiment of the present invention. FIG. 9 illustrates an angled side view of a vehicle locking boot according to an exemplary embodiment of the present invention. FIG. 10 illustrates an exemplary front engagement protrusion of a vehicle locking boot according to an exemplary embodiment of the present invention. FIG. 11 illustrates an exemplary spacer of a vehicle locking boot according to an exemplary embodiment of the present invention.

Referring to FIGS. 6-11, according to an exemplary embodiment of the present invention, a vehicle locking boot may include a horizontal support arm 101 and a first vertical support arm 102 extending from the horizontal support arm 101 along a direction orthogonal to an upper surface the horizontal support arm 101. The first vertical support arm 102 may include a front engagement protrusion 103 extending therefrom. A receiving sleeve 104 may extend from the horizontal support arm 101 at a base of the first vertical support arm 102 along a direction parallel to an extending direction of the horizontal support arm 101. A horizontal extension portion 105 may be coupled to the horizontal support arm 101. A second vertical support arm 106 may extend from the horizontal extension portion 105 along the direction orthogonal to the upper surface of the horizontal support arm 101. The second vertical support arm 106 may include a rear engagement protrusion 107 extending therefrom. The front engagement protrusion 103 may face the rear engagement protrusion 107. A keypad 108 may be disposed on the first vertical support arm 102. The keypad 108 may be configured to lock and unlock the horizontal extension portion 105. A lug nut blocking plate 109 may be coupled to the first vertical support arm 102 above the front engagement protrusion 103. A spacer 601 is removably coupled to the horizontal support arm 101. The spacer 601 extends along the extending direction of the horizontal support arm 101.

The spacer 601 substantially closes a space between the horizontal support arm 101 and a tire positioned above the spacer 601 (see, e.g., FIG. 5). Accordingly, tampering with the vehicle locking boot by objects (e.g., a pry bar or crowbar) positioned between the horizontal support arm 101 and the tire may be reduced or eliminated by the spacer 601. For example, the spacer 601 may be positioned and dimensioned to be in direct contact with a tire, thus eliminating an open space into which tools (e.g., a pry bar or crowbar) could be inserted. Accordingly, tampering with the vehicle locking boot may be reduced or eliminated through use of the spacer 601.

According to an exemplary embodiment of the present invention, a diameter of the rear engagement protrusion 107 may taper to about ⅜ of an inch along a direction toward the front engagement protrusion 103. For example, the diameter of the rear engagement protrusion 107 may taper to about ⅜ of an inch from a diameter of about 2 inches along the direction toward the front engagement protrusion 103. Similarly, a diameter of the front engagement protrusion 103 may taper to about ⅜ of an inch along a direction toward the rear engagement protrusion 107.

According to an exemplary embodiment of the present invention, a length of the spacer 601 may be less than a length of the horizontal support arm 101 (see, e.g., FIG. 9). Thus, the spacer 601 may be smaller than a distance between the vertical support arms 102 and 106 in a closed state. Thus, a weight of the spacer 601 may be relatively low, and manufacturing costs of the vehicle locking boot may be reduced.

The vehicle locking boot described herein may include or be formed of aluminum or an aluminum alloy. The use of aluminum or aluminum alloy in forming the vehicle locking boot may reduce a weight of the vehicle locking boot when compared with steel.

Reducing an overall weight of the vehicle locking boot including the spacer 601 may allow the vehicle locking boot to be more easily manipulated to be attached to or removed from a vehicle's wheel. Accordingly, damage to a vehicle or vehicle wheel may be reduced or eliminated.

According to an exemplary embodiment of the present invention, a side surface 602 of the spacer 601 facing the first vertical support arm 102 may be spaced apart from a side surface 603 the first vertical support arm 102. For example, the vehicle locking boot may include a space 901 between the spacer and the first vertical support arm 102 (see, e.g., FIG. 9). The space may be from 0.5 inches to 3 inches.

According to an exemplary embodiment of the present invention, a side surface 604 of the spacer 601 facing the second vertical support arm 106 may be substantially aligned with or slightly spaced apart from a side surface 605 of the horizontal support arm 101 facing the second vertical support arm 106 (see, e.g., FIGS. 6 and 9). This may maximize contact between the spacer 601 and a vehicle's tire without making the spacer 601 unnecessarily large. As an example, the spacer 601 may have substantially a same width as a vehicle's tire, thus eliminating an open space into which tools (e.g., a pry bar or crowbar) could be inserted. Accordingly, tampering with the vehicle locking boot may be reduced or eliminated.

According to an exemplary embodiment of the present invention, the spacer 601 may include a plastic frame having a hollow center. As an example, the hollow center of the plastic frame may be substantially filled with foam. Thus, a weight of the spacer 601 may be minimized, while maximizing strength and structural integrity of the spacer 601. As an example, the spacer 601 may include or may be formed of rubber or plastic; however, exemplary embodiments of the present invention are not limited thereto.

According to an exemplary embodiment of the present invention, the spacer 601 may include a plurality of pins (see, e.g., pins 701 and 702 in FIG. 7 or compression pins 1110, 1111, 1112 and 1113 in FIG. 11) positioned and dimensioned to be inserted into corresponding holes (see, e.g., holes 710, 711, 712 and 713 in FIGS. 7 and 10) formed in the horizontal support arm 101.

According to an exemplary embodiment of the present invention, the pins may be compression pins (see, e.g., FIG. 11) configured to removably couple the spacer 601 to the horizontal support arm 101.

According to an exemplary embodiment of the present invention, the front engagement protrusion 103 may include a plastic or rubber coating 801.

According to an exemplary embodiment of the present invention, the rear engagement protrusion 107 may include a plastic or rubber coating 802. Thus, damage to a vehicle's wheel may be reduced or eliminated.

Figure 12:
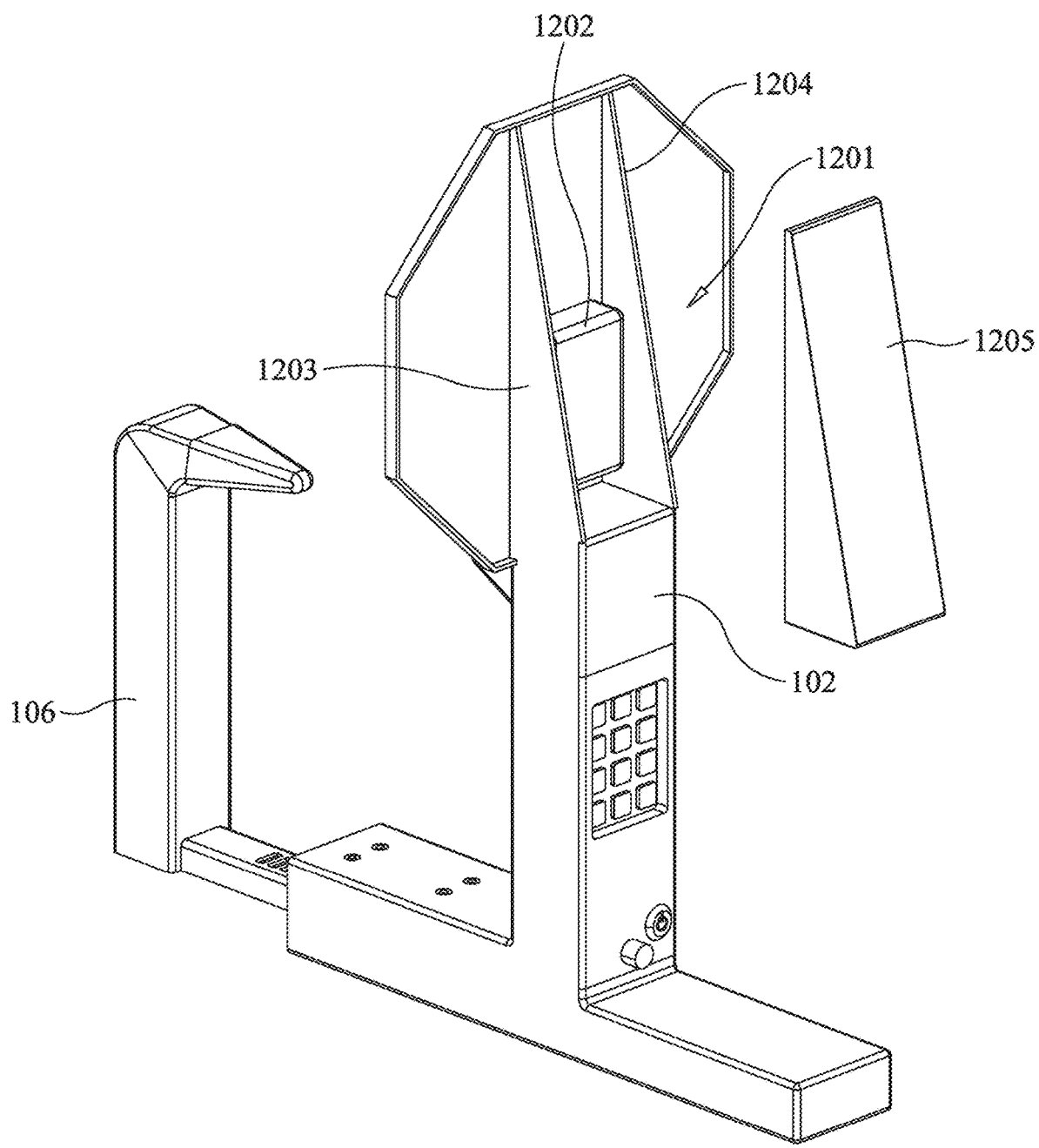
FIG. 12 illustrates a perspective view of a vehicle locking boot according to an aspect of the present disclosure.
Figure 13:
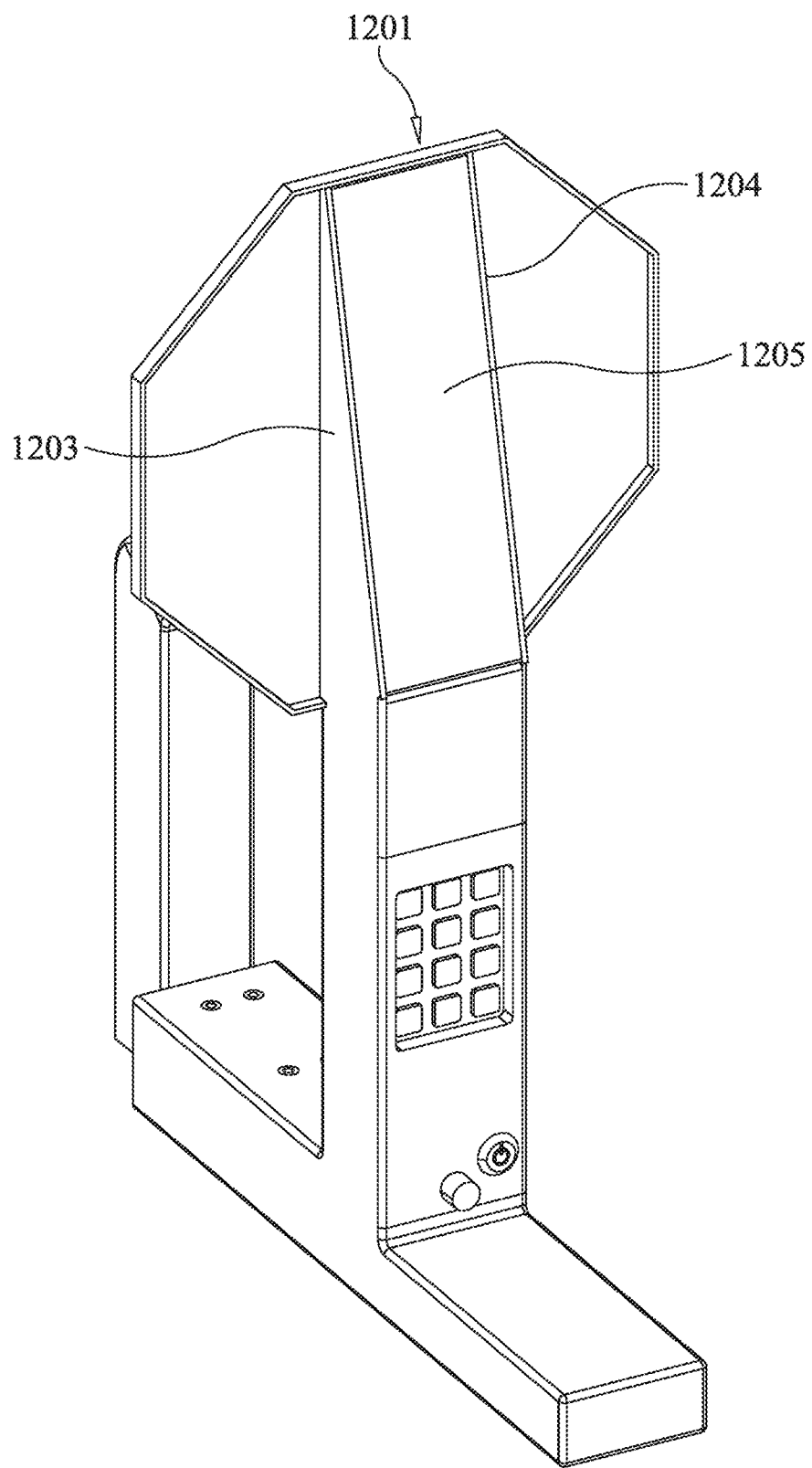
FIG. 13 illustrates a rear perspective view of the vehicle locking boot of FIG. 12.
Figure 14:
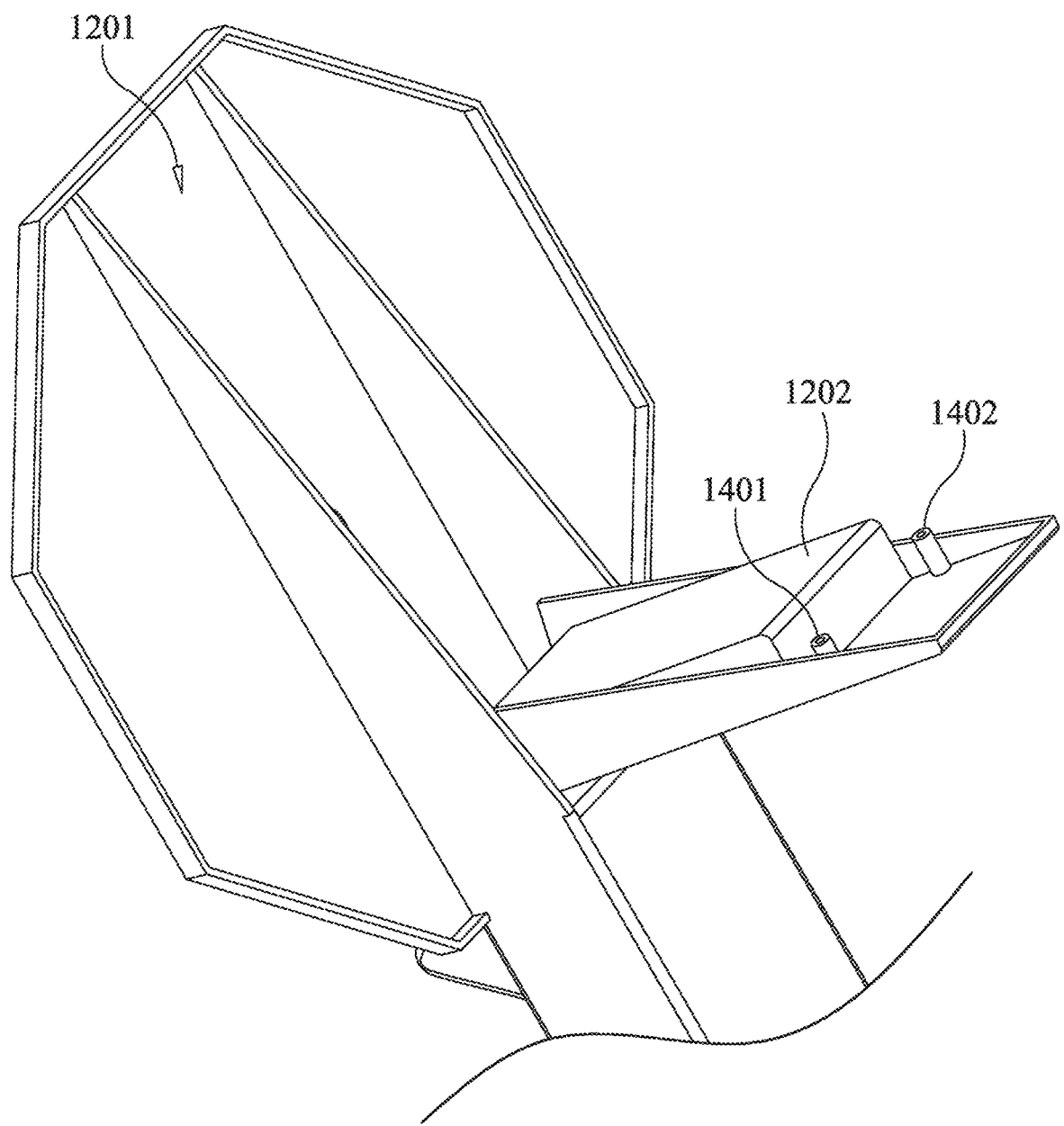
FIG. 14 illustrates a close up view of an interior of a GPS housing and a GPS unit according to an exemplary embodiment of the present disclosure.
Figure 15:
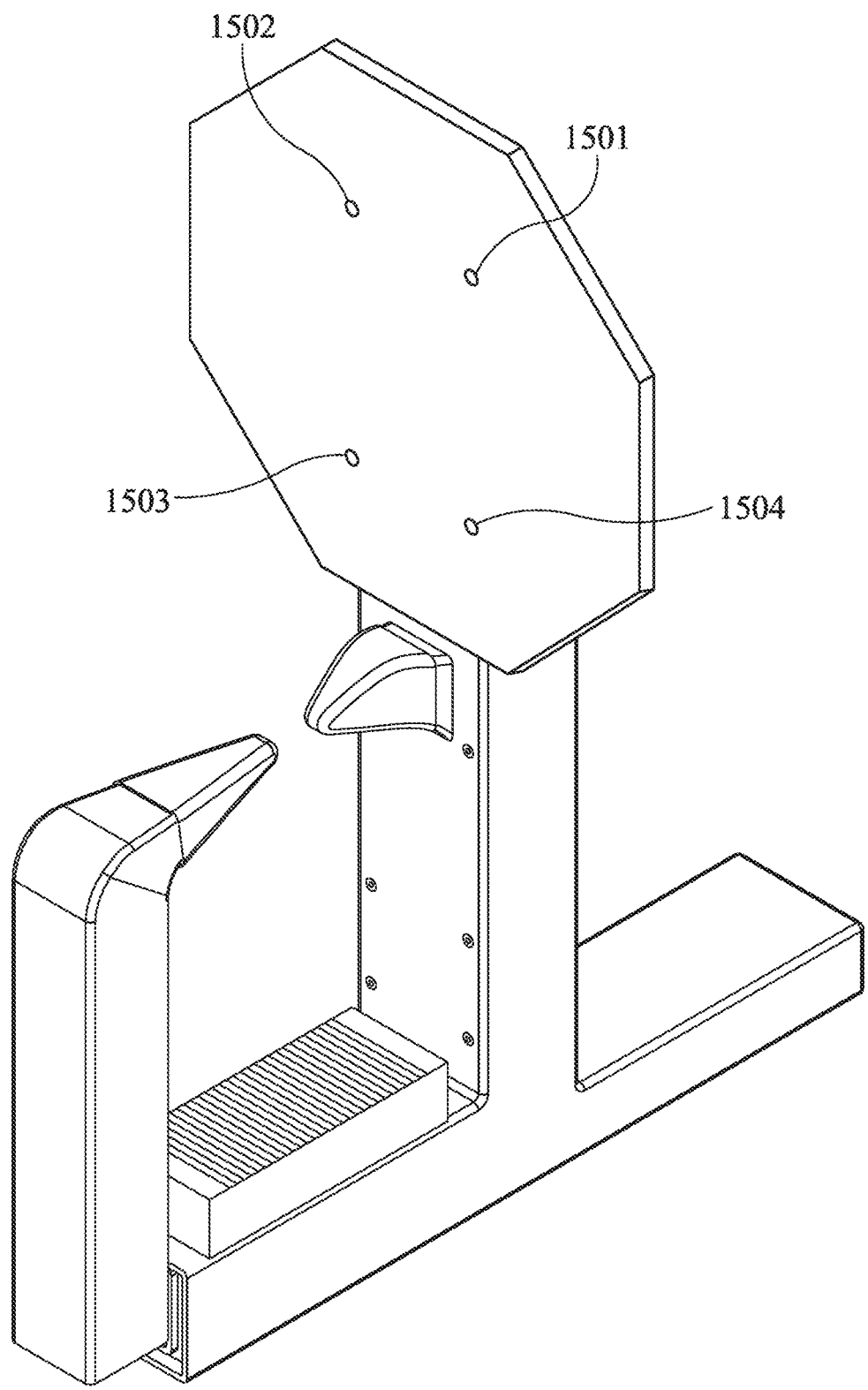
FIG. 15 illustrates an angled front view of the vehicle locking boot of FIG. 12.
Figure 16:
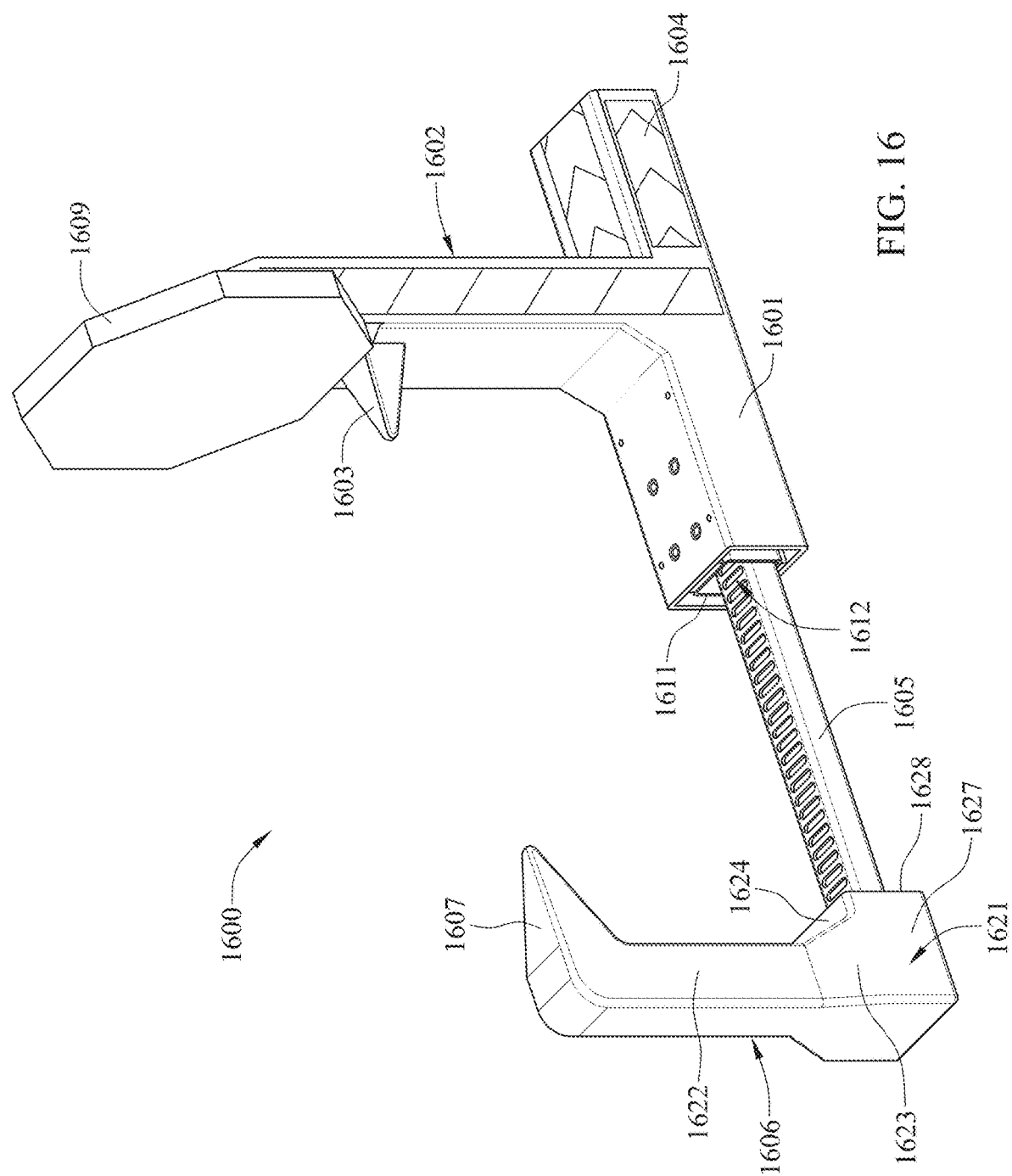
FIG. 16 is a first front, perspective view of a vehicle locking boot in an expanded configuration according to an aspect of the present disclosure.
Figure 17:
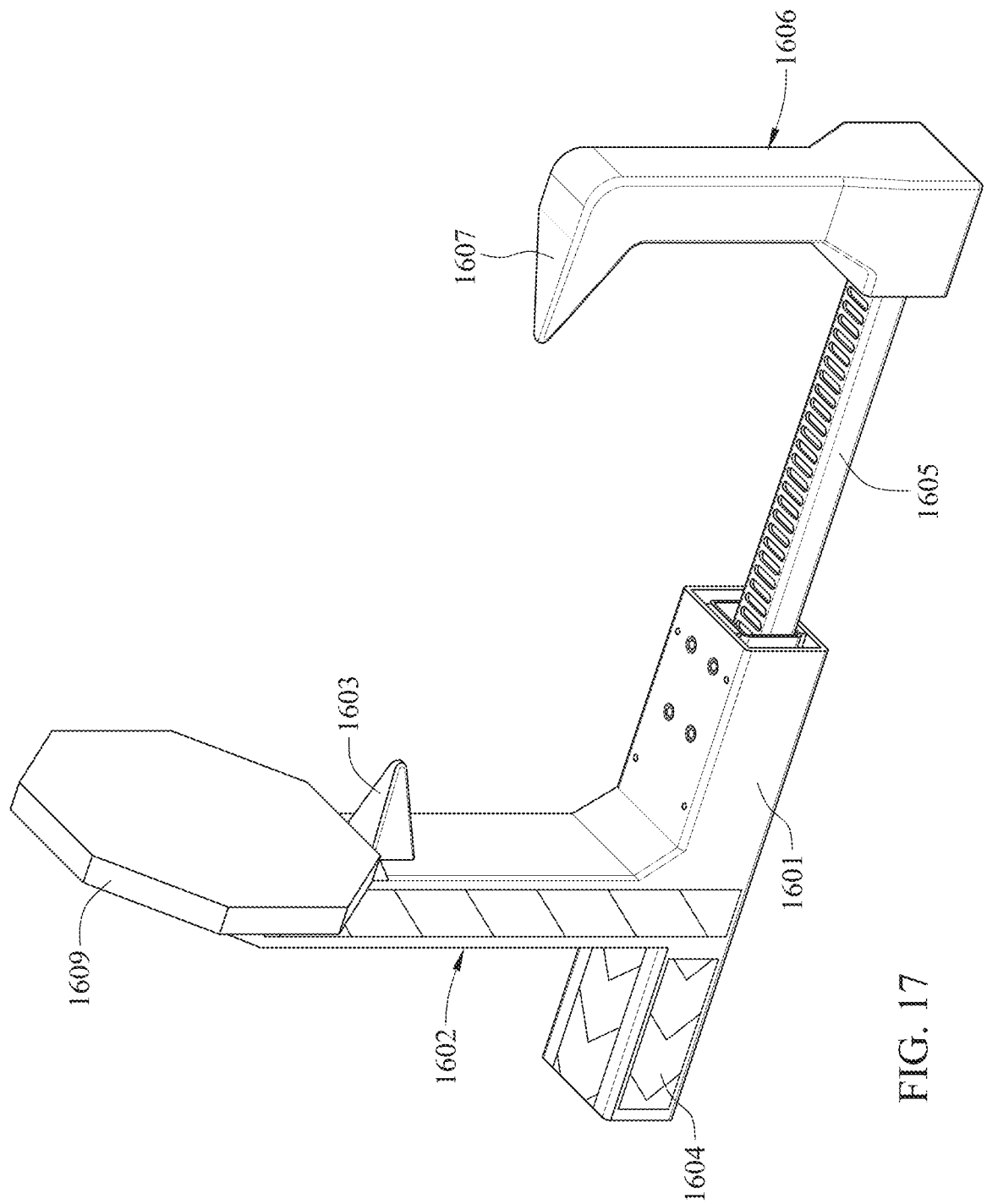
FIG. 17 is a second front, perspective view of the vehicle locking boot of FIG. 16 in an expanded configuration.

FIG. 12 illustrates a perspective view of a vehicle locking boot according to an exemplary embodiment of the present invention. FIG. 13 illustrates a rear perspective view of the vehicle locking boot of FIG. 12. FIG. 14 illustrates a close up view of an interior of a GPS housing and a GPS unit according to an exemplary embodiment of the present invention. FIG. 15 illustrates an angled front view of the vehicle locking boot of FIG. 12.

Referring to FIGS. 12-15, a global positioning system (GPS) housing 1201 is positioned at an upper portion of the first vertical support arm 102. A GPS unit 1202 is positioned in the GPS housing 1201. The GPS unit 1202 includes a GPS transmitter. The GPS unit 1202 may additionally include a GPS receiver. The GPS unit 1202 is configured to allow detection of a location of the vehicle locking boot described herein by determining a location of the GPS unit 1202. The GPS unit 1202 may also transmit a position of the vehicle locking boot. As described below in more detail, the GPS transmitter is able to transmit signals through the GPS housing 1201 and the GPS receiver is able to receive signals through the GPS housing 1201.

According to an exemplary embodiment of the present invention, the GPS housing 1201 includes a first side plate 1203 and a second side plate 1204 opposite the first side plate. The first and second side plates 1203 and 1204 may extend along the lug nut blocking plate 109, such as along substantially an entire vertical dimension of the lug nut blocking plate 109. The first and second side plates 1203 and 1204 may each be angled sidewalls that gradually taper in width along the vertical dimension of the lug nut blocking plate 109. A rear plate 1205 is positioned between the first and second side plates 1203 and 1204. The rear plate 1205 may be formed of reinforced plastic.

According to an exemplary embodiment of the present invention, the reinforced plastic may be a Fiber-reinforced plastic (FRP) FRP is a composite material including a polymer matrix reinforced with fibers. The fibers may be glass (e.g., fiberglass), carbon (e.g., carbon fiber reinforced polymer), aramid, or basalt. The polymer may be an epoxy, vinyl ester, or polyester thermosetting plastic.

Applicant has determined that the arrangement of the GPS housing 1201, as described herein in various embodiments, allows the GPS unit 1202 to receive and transmit signals to identify and track a location of a vehicle locking boot. This allows for location and recovery of lost or stolen boots, which may reduce costs associated with booting vehicles. For example, even when the vehicle locking boot is formed of steel or aluminum alloy, which could interfere with GPS signal transmission, Applicant has unexpectedly discovered that the arrangement of the GPS housing 1201, as described herein in various embodiments, allows the GPS unit 1202 to receive and transmit signals to identify and track a location of a vehicle locking boot.

According to an exemplary embodiment of the present invention, the rear plate 1205 may be removably anchored to the lug nut blocking plate 109. Thus, the rear plate 1205 forms an enclosed GPS housing 1201 concealing the GPS unit 1202. For example, the rear plate 1205 may include a plurality of screw extensions (e.g., 1401, 1402—see, e.g., FIG. 14) configured to extend toward the lug nut blocking plate 109. The screw extensions may each be aligned with a corresponding hole (e.g., holes 1501, 1502, 1503, 1504—see, e.g., FIG. 15) formed in the lug nut blocking plate 109. Each corresponding hole may include a screw threaded into a corresponding screw extension and the screw heads may each be concealed by lug nut blocking pad 110. Each screw head may be countersunk into the lug nut blocking plate 109 to allow a substantially smooth surface for adhering the lug nut blocking pad 110. Thus, the presence of the GPS unit 1202 is not readily apparent to an observer of the vehicle locking boot, which may reduce or eliminate an occurrence of tampering or damage to the GPS unit 1202.

According to an exemplary embodiment of the present invention, the GPS unit 1202 may be configured to be activated by movement from a predetermined location. Initial movement of the GPS unit may be determined using a cellular tower network. Thus, unexpected or unauthorized movement of the vehicle locking boot may be detected and the location of the vehicle locking boot may be tracked. This allows for determining and tracking of a location of the vehicle locking boot and recovery of the vehicle locking boot, thus reducing costs for booting vehicles. Use of a cellular tower network allows for a relatively low amount of battery power to be used for location tracking compared with satellite tracking, thus longevity of the battery described in more detail below may be increased and a size of the battery may be reduced. As described in more detail below, the battery associated with the GPS unit 1202 may have a battery life of 1-2 years even with relatively constant use of the vehicle locking boot described herein.

According to an exemplary embodiment of the present invention, a location of the GPS unit 1202 may be determined by a Global Navigation Satellite System (GNSS) network after the initial movement of the GPS unit 1202 is detected. The location of the GPS unit 1202 determined by the GNSS may be determined at a predetermined rate (e.g., one or two times per day, or continuously if desired). Determining the location of the GPS unit 1202 disposed in the vehicle locking boot, as described herein, allows a battery of the GPS unit to last for an extended period of time (e.g., as long as 1-2 years).

The GPS unit may be powered by a battery, such as a rechargeable battery. For example, the battery may be a lithium ion battery.

According to an exemplary embodiment of the present invention, the GPS unit 1202 may be programmable. Programming the GPS unit allows, for example, setting the rate at which the location of the GPS unit 1202 is determined. The GPS unit 1202 may include a WiFi or cellular network receiver. Thus, the GPS unit may be connected with remotely, and programming of the GPS unit may be accomplished from a remote location (e.g., via connection over WiFi or a cellular tower network).

Referring to FIGS. 16 to 24, a vehicle locking boot 1600 includes a horizontal support arm 1601. The horizontal support arm 1601 defines a horizontal axis (see, e.g., axis 401 in FIG. 4) extending along the horizontal support arm 1601. The horizontal support 1601 arm includes a thermoplastic polymer. A track 1611 is formed in the horizontal support arm 1601. The track 1611 extends along the horizontal axis defined by the horizontal support arm 1601.

A first vertical support arm 1602 extends from the horizontal support arm 1601 along a direction orthogonal to an upper surface of the horizontal support arm 1601. The first vertical support arm 1602 includes a front engagement protrusion 1603 extending therefrom. The first vertical support 1602 arm includes the thermoplastic polymer.

In exemplary embodiment, the thermoplastic polymer including in the various components of the vehicle locking boot 1600 described herein may be or may include polypropylene. The thermoplastic polymer (e.g., polypropylene) may be combined in a mixture with fiberglass, as described below in more detail.

A receiving orifice 1612 is defined in the horizontal support arm 1601 and extends along a direction parallel to an extending direction of the horizontal support arm 1601 (e.g., along the horizontal axis, such as horizontal axis 401 in FIG. 4). The receiving orifice 1612 may extend through the horizontal support arm 1601 and the receiving sleeve 1604.

A horizontal extension portion 1605 is coupled to the track 1611 formed in the horizontal support arm 1601. The horizontal extension portion 1605 is slidably received in the receiving orifice 1612 by sliding horizontally along the track 1611 formed in the horizontal support arm 1601.

A second vertical support arm 1606 extends from the horizontal extension portion 1605 along the direction orthogonal to the upper surface of the horizontal support arm 1601. The second vertical support arm 1606 includes a rear engagement protrusion 1607 extending therefrom. The second vertical support arm 1606 includes the thermoplastic polymer. A lug nut blocking plate 1609 extends from the first vertical support arm 1602 above the front engagement protrusion 1603. The lug nut block plate 1609 includes the thermoplastic polymer. A pad (see, e.g., pad 110 in FIG. 2) may be arranged on the lug nut block plate 1609.

Figure 18:
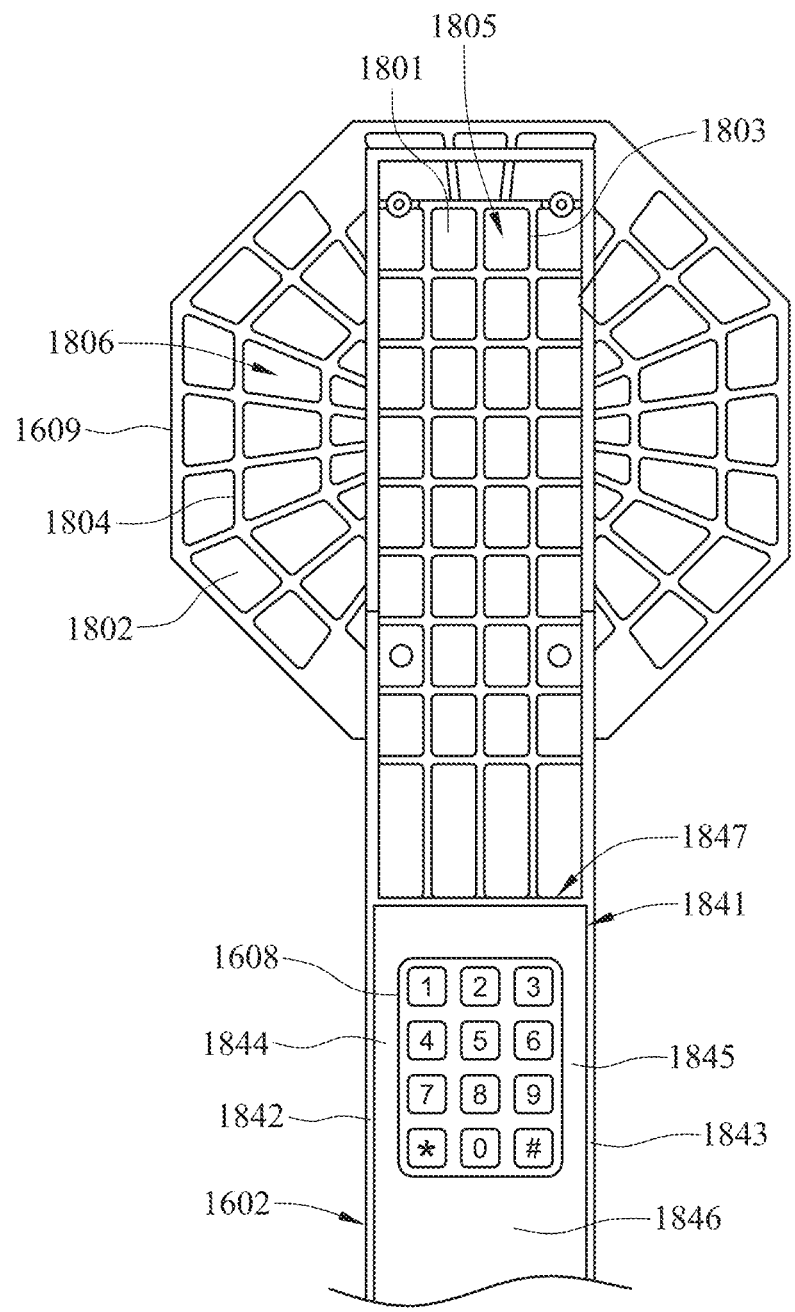
FIG. 18 is a rear view of an interior of a vertical support arm and a lug nut blocking plate of the vehicle locking boot of FIG. 16.

Referring particularly to FIG. 18, a first rear surface 1801 is defined by the first vertical support arm 1602. A second rear surface 1802 is defined by the lug nut blocking plate 1609. A number of first interconnected support walls 1803 extend along a direction orthogonal to the first rear surface 1801 of the first vertical support arm 1602. The first interconnected support walls 1803 are configured to increase a rigidity of the first vertical support arm 1602.

A number of second interconnected support walls 1804 extend along a direction orthogonal to the second rear surface 1802 of the lug nut blocking plate 1609. The second interconnected support walls 1804 are configured to increase a rigidity of the lug nut blocking plate 1609. The interconnected support walls 1803 and 1804 each define a number of open spaces 1805 and 1806 therebetween, which expose the rear surfaces 1801 and 1802, respectively. This arrangement of the interconnected support walls 1803 and 1804 provides structural rigidity to the first vertical support arm 1602 and the lug nut blocking plate 1609, while also reducing the weight of the first vertical support arm 1602 and the lug nut blocking plate 1609 and reducing the overall weight of the vehicle locking boot 1600. The interconnected support walls 1803 and 1804 may define a checkered, honeycomb, or spiderweb pattern. The same or a similar arrangement of interconnected support walls may be formed in any component described herein that is formed of or includes a thermoplastic polymer (e.g., the horizontal support arm 1601 or the second vertical support arm 1606). While the interconnected support walls 1804 are shown as exposed in the figures, a cover or plate may be arranged to cover the support walls 1804. That is the interconnected support walls 1803 and 1804 might not be visible when the vehicle locking boot is in use.

In an aspect of the present disclosure, the horizontal support arm 1601, the first vertical support arm 1602, and the luck nut block plate 1609 are a single integrally formed structure and may each be formed substantially entirely from the thermoplastic polymer. For example, each of the horizontal support arm 1601, the first vertical support arm 1602, and the luck nut block plate 1609 may be manufactured in a comment mold (e.g., a family mold). Each of the horizontal support arm 1601, the first vertical support arm 1602, and the luck nut block plate 1609 may include or may be formed of the same thermoplastic polymer as each other, such as by employing a single mold.

In an aspect of the present disclosure, the thermoplastic polymer is polycarbonate. The thermoplastic polymer may include, for example, discontinuous carbon fibers or nylon.

In an aspect of the present disclosure, the second vertical support arm 1606 includes a base member 1621 connected with the horizontal extension portion 1605 and a vertical extension portion 1622 supporting the rear engagement protrusion 1607.

Figure 19:
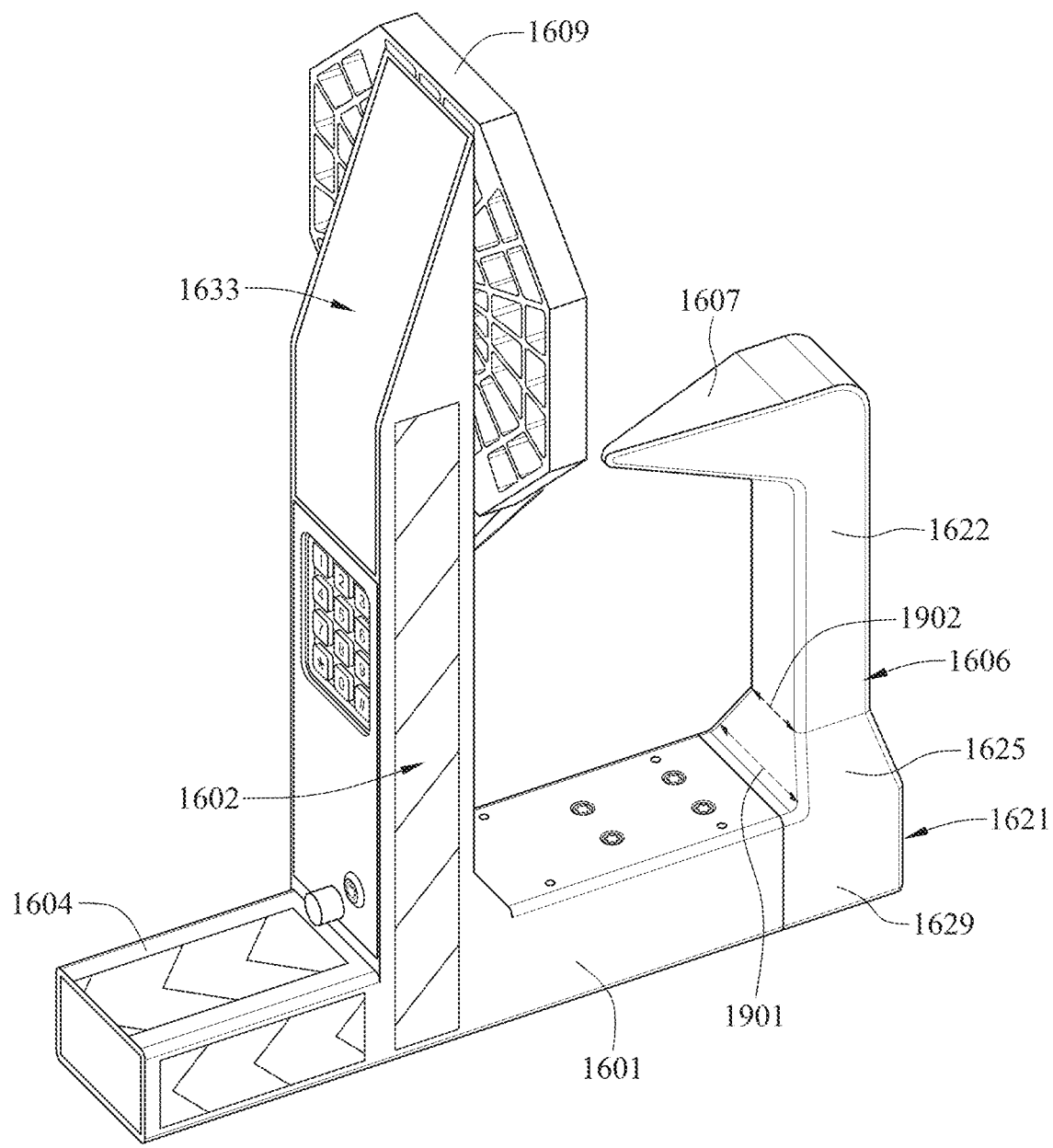
FIG. 19 is a first rear, perspective view of the vehicle locking boot of FIG. 16.
Figure 20:
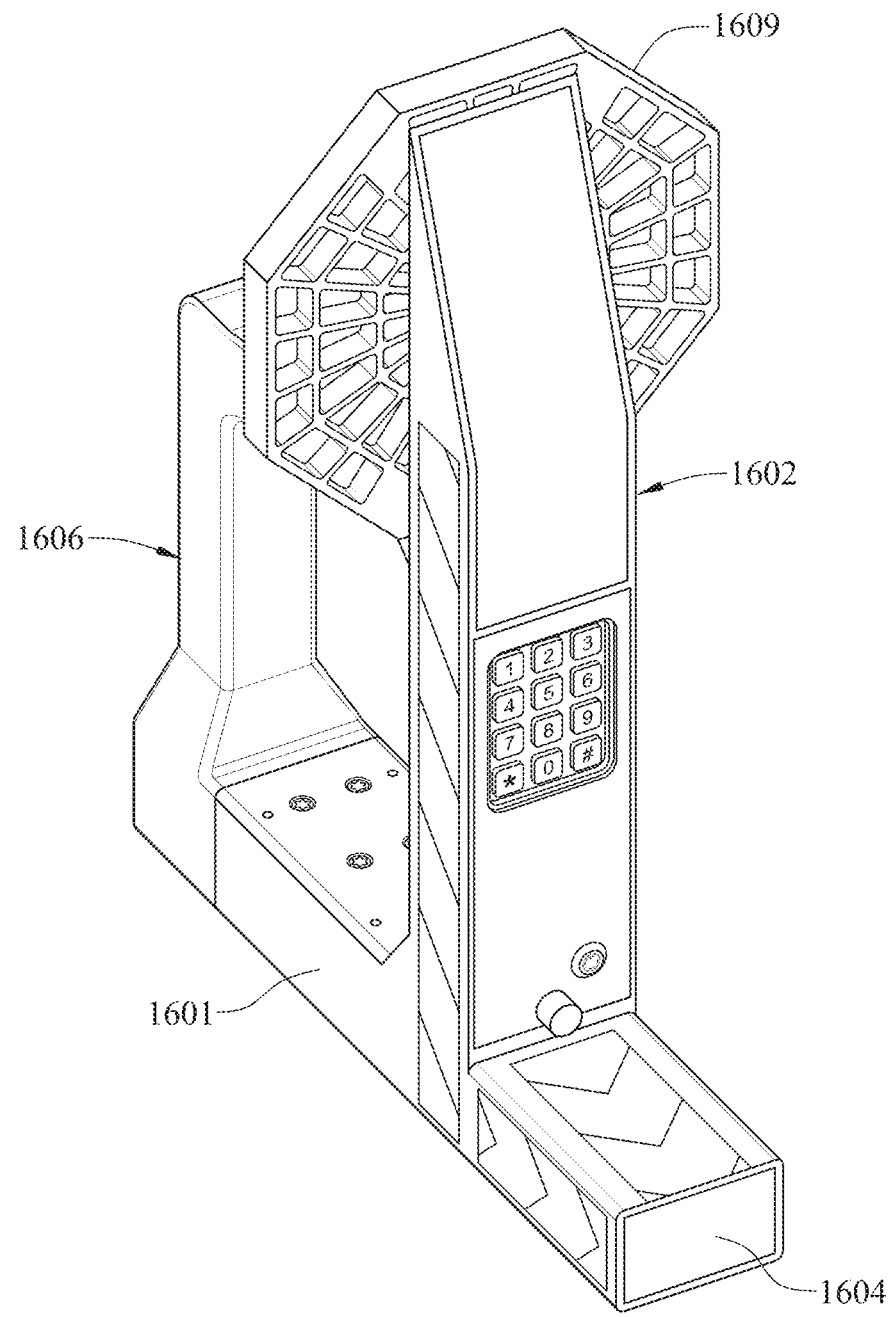
FIG. 20 is a second rear, perspective view of the vehicle locking boot of FIG. 16.

Referring particularly to FIGS. 1 and 19, the base member 1621 defines a first width 1901 greater than a second width 1902 defined by the vertical extension portion.

In an aspect of the present disclosure, the base member 1621 of the second vertical support arm 1606 defines a first angled sidewall 1623, a second angled sidewall 1624, and a third angled sidewall 1625 (see, e.g., FIG. 19). A side 1626 (see, e.g., FIG. 23) of the base member 1621 opposite the second angled sidewall 1624 may define a substantially flat surface that is vertically aligned with the vertical extension portion 1622. That is, the base member 1621 may define a shape having 3 angled side surfaces and four vertical side surfaces.

In an aspect of the present disclosure, the base member 1621 includes a first vertical sidewall 1627 extending from the first angled sidewall 1623, a second vertical sidewall 1628 extending form the second angled sidewall 1624, and a third vertical sidewall 1629 (see, e.g., FIG. 19) extending from the third angled sidewall 1625.

The shape and dimensions of the base member 1621 increase a strength of the second vertical support arm 1606, particularly at the connection between the base member 1621 and the horizontal extension portion 1605. The base member 1621 may be connected with the horizontal extension portion 1605 by one or more bolts or screws. The shape and dimensions of the base member 1621 increase a strength of the second vertical support arm 1606 and prevent tampering with or breaking the connection between the base member 1621 and the horizontal extension portion 1605.

Figure 21:
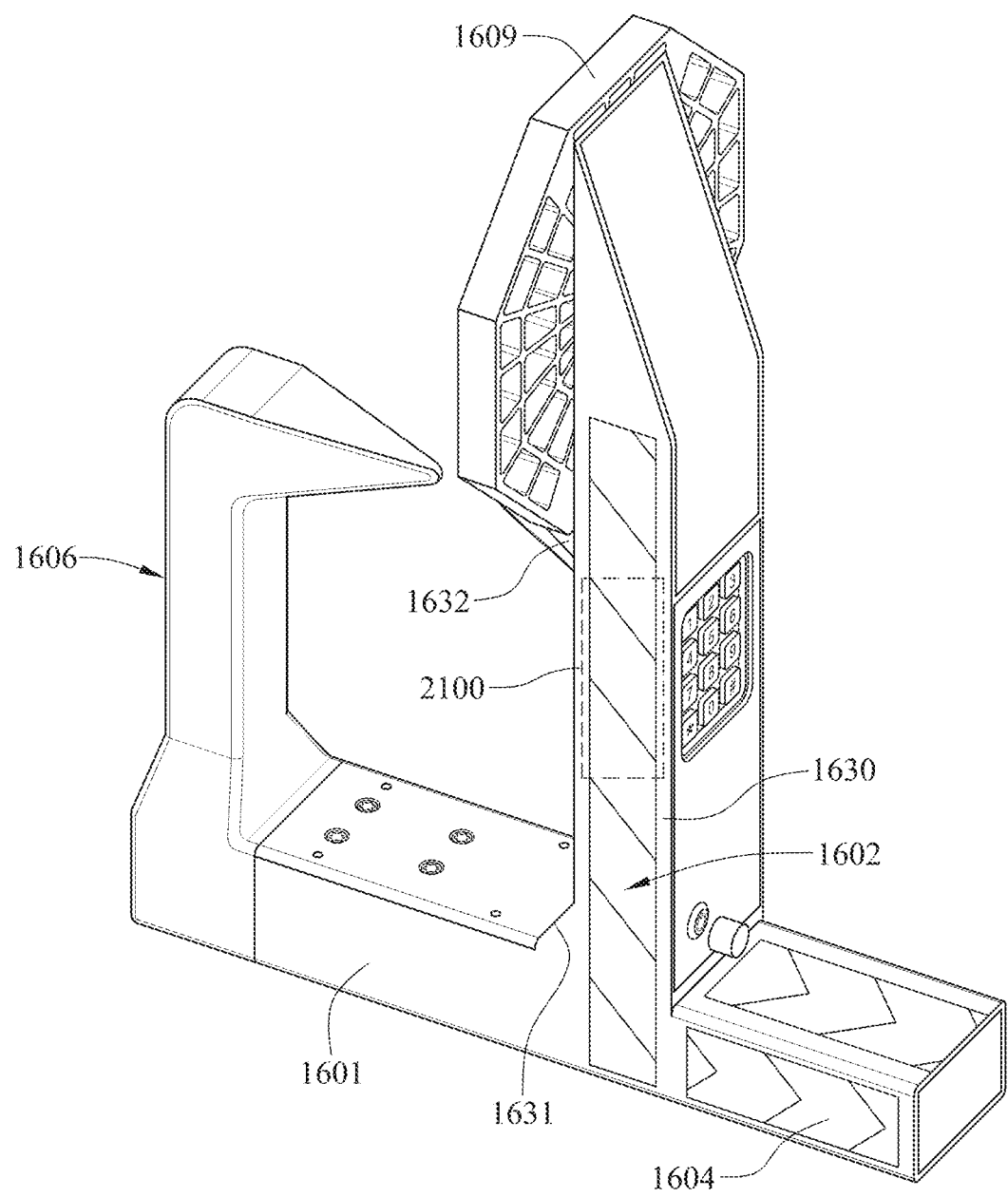
FIG. 21 is a third rear, perspective view of the vehicle locking boot of FIG. 16.
Figure 22:
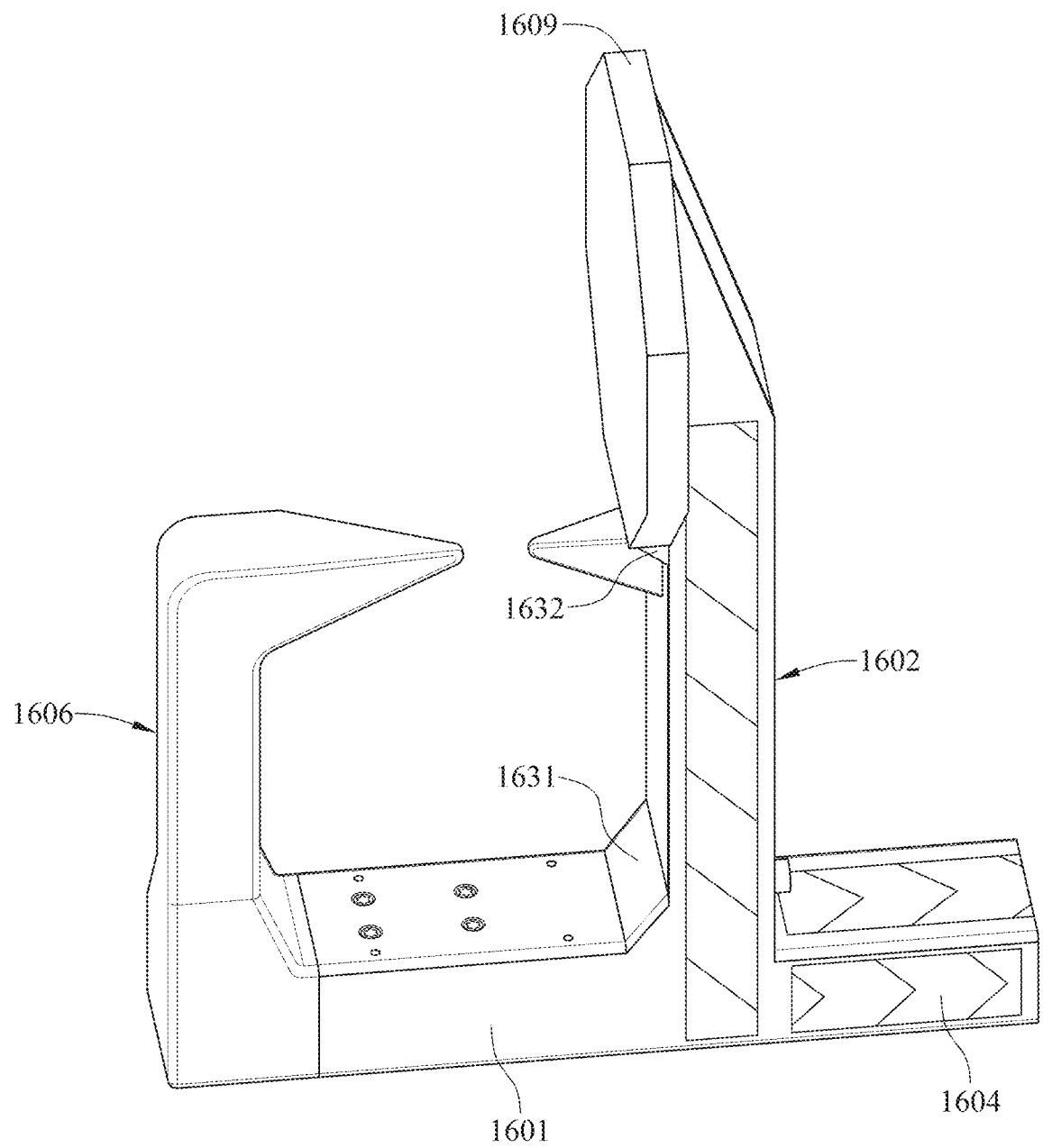
FIG. 22 is a side view of the vehicle locking boot of FIG. 16.
Figure 23:
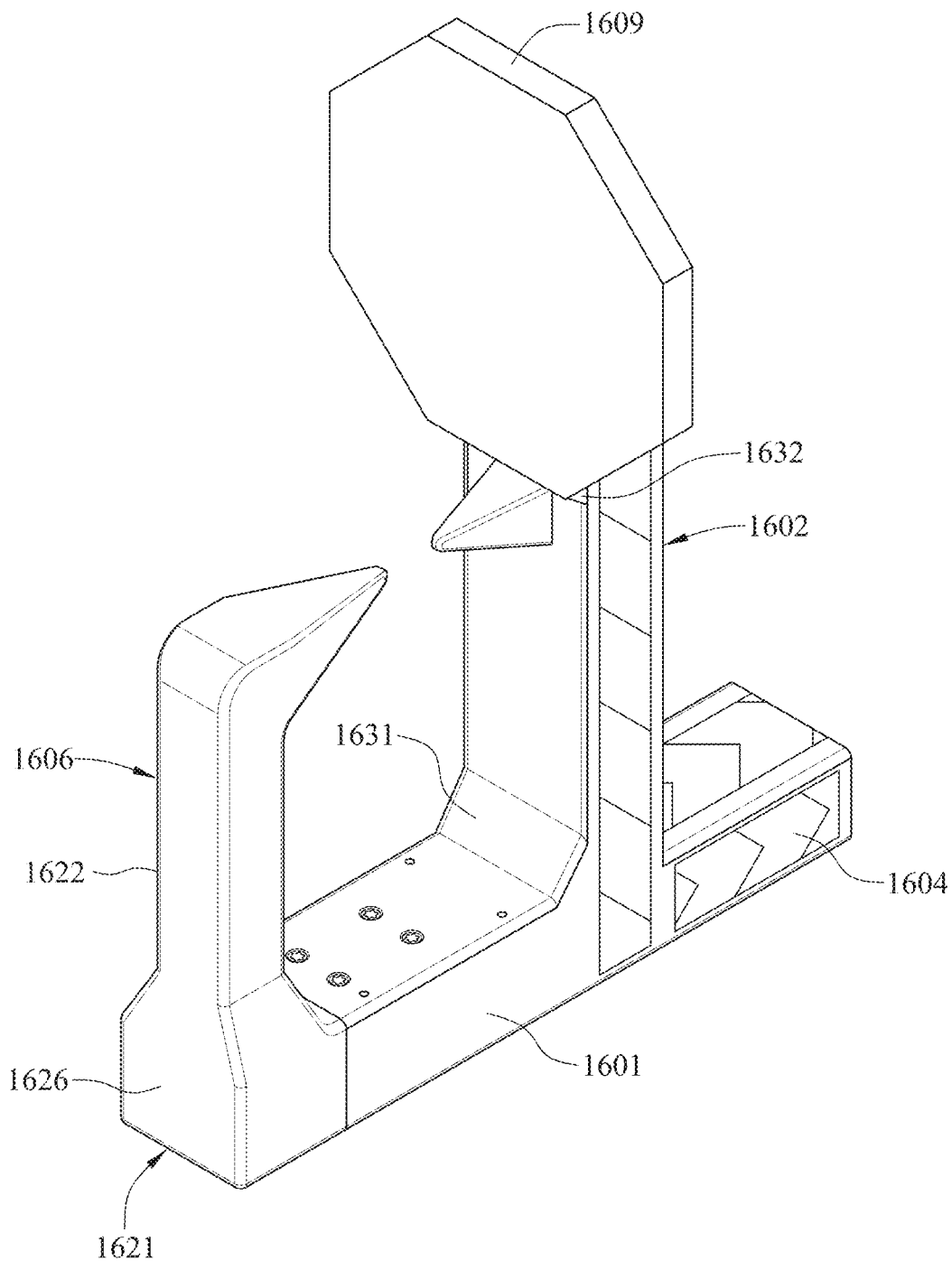
FIG. 23 is a first front, perspective view of the vehicle locking boot of FIG. 16 in a collapsed configuration.
Figure 24:
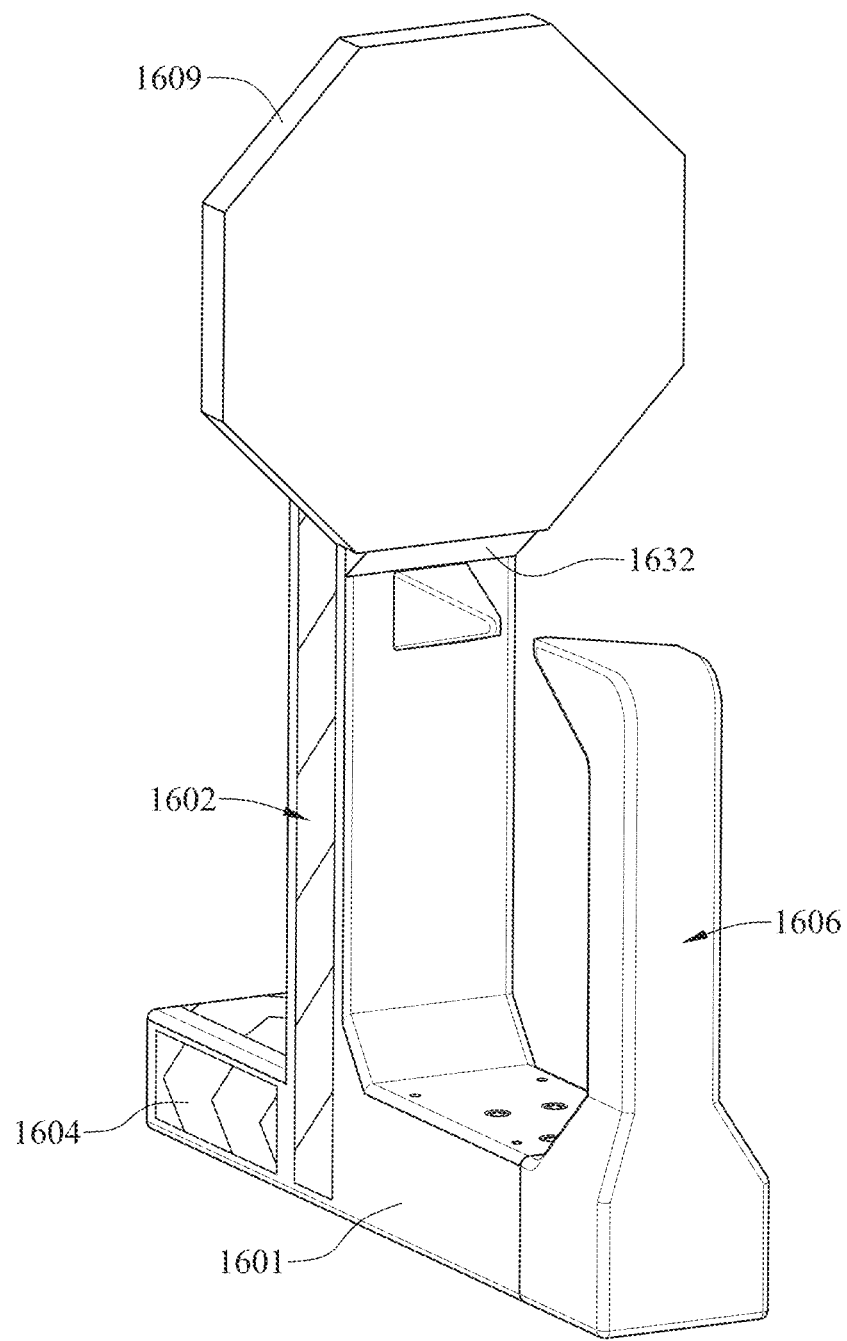
FIG. 24 is a second front, perspective view of the vehicle locking boot of FIG. 16 in a collapsed configuration.

Referring particularly to FIG. 21, the first vertical support arm 1602 includes a vertical extension portion 1630, a first angled sidewall 1631 extending between the horizontal support arm 1601 and the vertical extension portion 1630, and a second angled sidewall 1632 extending between the lug nut blocking plate 1609 and the vertical extension portion 1630. The shape and dimensions of the angled sidewalls 1631 and 1632 increase a strength of the first vertical support arm 1602 and the horizontal support arm 1601. The shape and dimensions of the angled sidewalls 1631 and 1632 also decrease an area in which a tool can be applied to forcibly remove the vehicle locking boot 1600 from a vehicle. Therefore, the shape and dimensions of the angled sidewalls 1631 and 1632 prevent tampering with the vehicle locking boot 1600.

Referring particularly to FIGS. 18 to 21, a recess 1841 is defined in the first vertical support arm 1602. The recess 1841 is defined by a first inner sidewall 1842 of the first vertical support arm 1602 and a second inner sidewall 1843 of the first vertical support arm 1602. A keypad assembly 1608 is arranged in the recess 1841 defined in the first vertical support arm 1602. The keypad assembly 1608 defines a first outward facing sidewall 1844 configured to face the first inner sidewall 1842 of the first vertical support arm 1602. The keypad assembly 1608 defines a second outward facing sidewall 1845 configured to face the second inner sidewall 1843 of the first vertical support arm 1602. That is, the sidewalls 1844 and 1845 of the keypad assembly 1608 are concealed within the recess 1841. That is, the front surface 1846 of the keypad assembly 1608 defines a continuously flush surface with outer sidewalls 1842 and 1843. The arrangement of the keypad assembly 1608 in the recess 1841 prevents tampering with or forced removal of the keypad assembly 1608, particularly when compared with a surface mounted keypad assembly in which the sidewalls of the keypad assembly are exposed.

In an aspect of the present disclosure, a compartment 1847 is defined in the first vertical support arm 1602. The compartment 1847 is configured to house a global positioning system module (see, e.g., GPS unit 1202 in FIG. 12). A compartment cover 1633 is configured to be removably coupled with the lug nut blocking plate 1609 or the first vertical support arm 1602 to close the compartment 1847.

Figure 25:
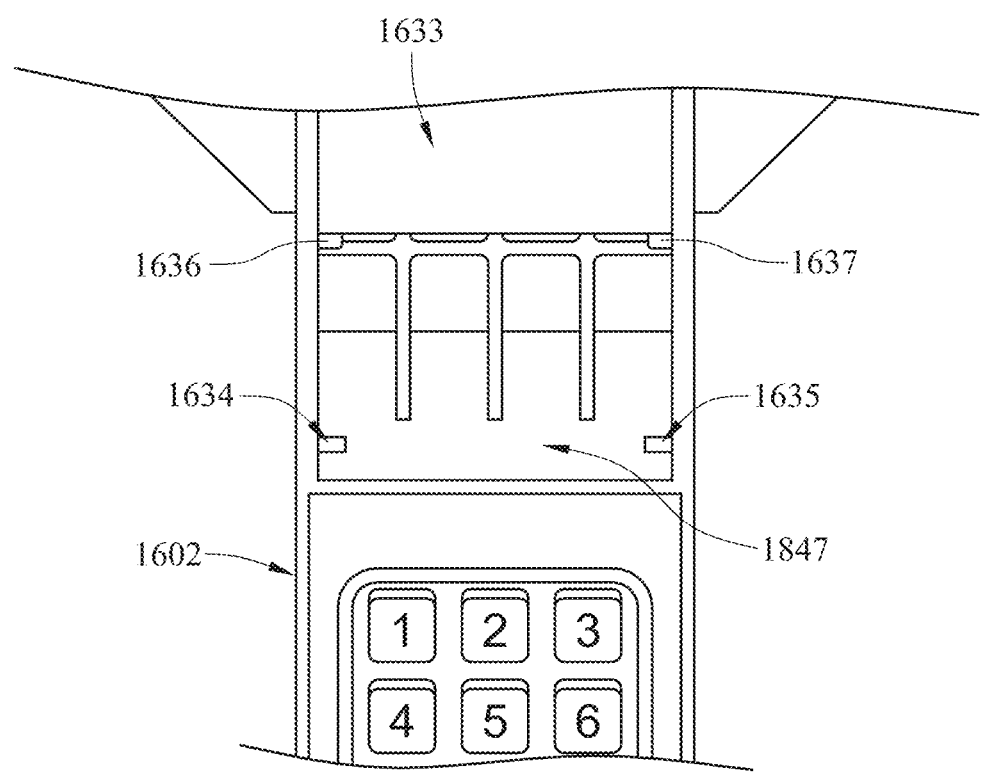
FIG. 25 is an enlarged view of the interior of a vertical support arm and a partially removed rear plate of the vehicle locking boot of FIG. 16 according to an aspect of the present disclosure.
Figure 26:
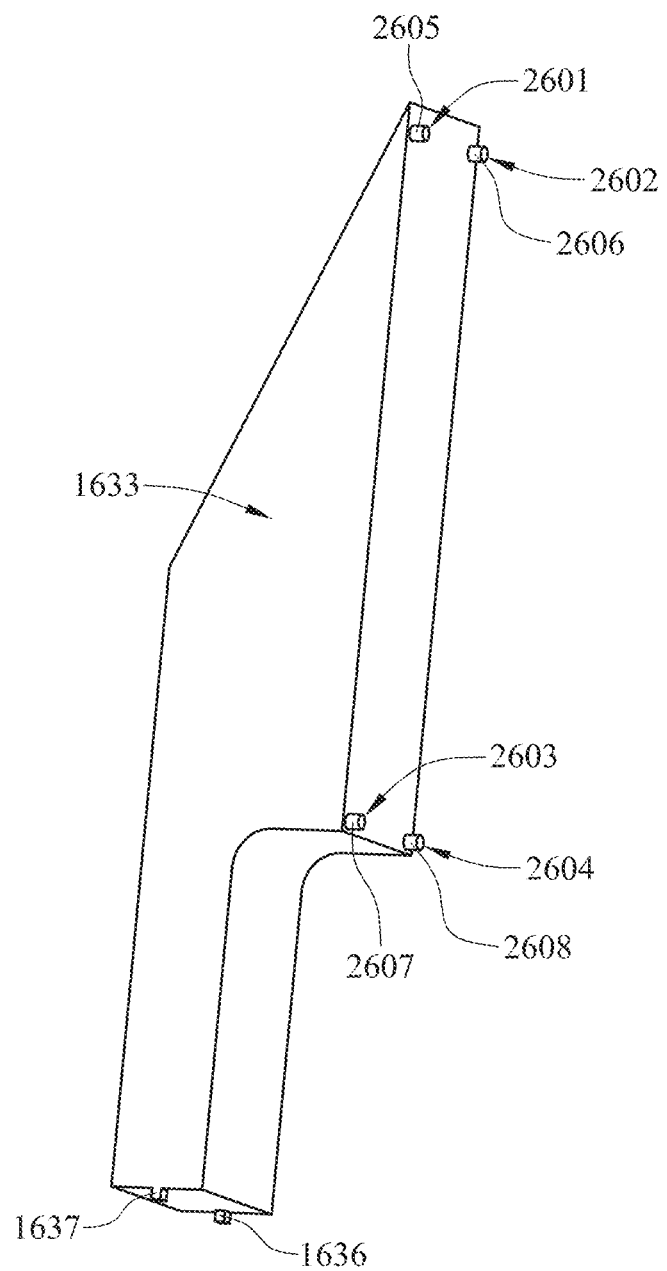
FIG. 26 is a rear, perspective view of a rear plate employable by the vehicle locking boot of FIG. 16.

Referring particularly to FIGS. 18, 25, and 26, at least two orifices 1634 and 1635 are formed in a wall of the compartment 1847. At least two projections 1636 and 1637 extend from the compartment cover 1633. Each projection 1636 and 1637 is configured to be received in a corresponding orifice 1634 and 1635 to prevent lateral movement of the compartment cover 1633 with respect to the compartment 1847. While two projections and two orifices are shown and described, various numbers of projections and orifices may similarly be implemented (e.g., one projection/orifice, 3 projections/orifices, etc.).

Referring particularly to FIG. 26, the compartment cover 1633 may include a number of orifices (e.g., any of 2601, 2602, 2603, and/or 2604) configured to receive screws or bolts therein to secure the compartment cover 1633 with the lug nut blocking plate 1609 or the first vertical support arm 1602 to close the compartment 1847. The orifices may be defined in projections (e.g., any of 2605, 2606, 2607, and/or 2608) configured to extend away from the compartment cover 1633 to be received in the lug nut blocking plate 1609 or the first vertical support arm 1602 to close the compartment 1847.

The vehicle locking boot 1600 incorporating the various components formed of the thermoplastic polymer (e.g., polycarbonate) is relatively light in weight, without sacrificing necessary rigidity. In particular, the arrangement of the connecting sections between the various horizontal and vertical components is expanded to prevent tampering or breakage that is comparable to a metal (e.g., steel) boot. In particular, the weight of the vehicle locking boot 1600 is approximately 8-10 lbs, compared with a conventional boot, which is approximately 18 lbs. The reduction in overall weight provides vehicle locking boot 1600 that is easier to install and easier to remove, in part as a result of the reduced weight. Additionally, the use of a thermoplastic polymer (e.g., polycarbonate) prevents metal to metal contact between a vehicle locking boot and the wheel of a vehicle, thus preventing damage to the wheel of the vehicle.

The vehicle locking boot 1600 incorporating the various components formed of the thermoplastic polymer (e.g., polycarbonate) has also been found to increase the accuracy of GPS location by using a GPS module arranged in the vertical support arm 1602. That is, metal such as steel can interfere with a GPS signal transmission and can reduce accuracy of determining a location of a vehicle locking boot by employing GPS location. The vehicle locking boot 1600 incorporating the various components formed of the thermoplastic polymer (e.g., polycarbonate) increases GPS location accuracy by reducing interference with a GPS transmission signal. Additionally, increasing the reliability of the GPS signal reduces the number of GPS signals that need to be transmitted to locate the vehicle locking boot 1600 incorporating the various components formed of the thermoplastic polymer (e.g., polycarbonate), thus extending a lifespan of a battery employed in powering a GPS unit (see, e.g., GPS unit 1202 described in more detail above), and increasing an amount of time that the vehicle locking boot 1600 can be used in the field without the need for charging or battery replacement.

The various components of the vehicle locking boot 1600 may include and/or may be formed of a thermoplastic polymer (e.g., polypropylene) and at least one type of reinforcing fiber (e.g., fiberglass). As an example, a mixture including at least 85% polypropylene and at most 15% fiberglass may be used to form each of the non-metal components of the vehicle locking boot 1600.

In exemplary embodiments, each of the horizontal support arm 1601, the first vertical support arm 1602, protrusions 1603 and 1607, the receiving sleeve 1604, the second vertical support arm 1606, the luck nut block plate 1609, and any associated or integrally formed components thereof may include (i.e., may be formed of) a mixture of polypropylene and fiberglass combined in a mixture of about 90% polypropylene to about 10% fiberglass. Alternatively, the mixture of polypropylene and fiberglass may be combined in a mixture of about 88% polypropylene to about 8% fiberglass. Applicant has found through experimentation with various formulas that the above-noted proportions of polypropylene to fiberglass create an ideal strength to weight profile.

The vehicle locking boot 1600 incorporating the various components formed of the above-noted formulation of polypropylene and fiberglass is relatively light in weight, without sacrificing necessary rigidity. In particular, the arrangement of the connecting sections between the various horizontal and vertical components is expanded to prevent tampering or breakage that is superior to a metal (e.g., a steel or stainless steel) boot. In particular, the weight of the vehicle locking boot 1600 including the above-noted formulation of polypropylene and fiberglass is approximately 13 lbs, compared with a conventional boot, which is approximately 18 lbs. The reduction in overall weight provides vehicle locking boot 1600 that is easier to install and easier to remove, in part as a result of the reduced weight. Additionally, the use of a thermoplastic polymer and fiberglass prevents metal to metal contact between a vehicle locking boot and the wheel of a vehicle, thus preventing damage to the wheel of the vehicle.

In exemplary embodiments, the thermoplastic polymer may include a blend of polymers. For example, the thermoplastic polymer may include Polypropylene/Polyethylene (PP/PE) Blends, Polypropylene/Elastomer Blends (PP/EPDM, PP/EPR), Polypropylene/Polybutene-1 (PP/PB-1) Blends, Polypropylene/Polycarbonate (PP/PC) Blends, Polypropylene/Polystyrene (PP/PS) Blends, Polypropylene/Polyamide (PP/PA) Blends, or Polypropylene/Styrene-Ethylene-Butylene-Styrene (PP/SEBS) Blends.

Figure 27:
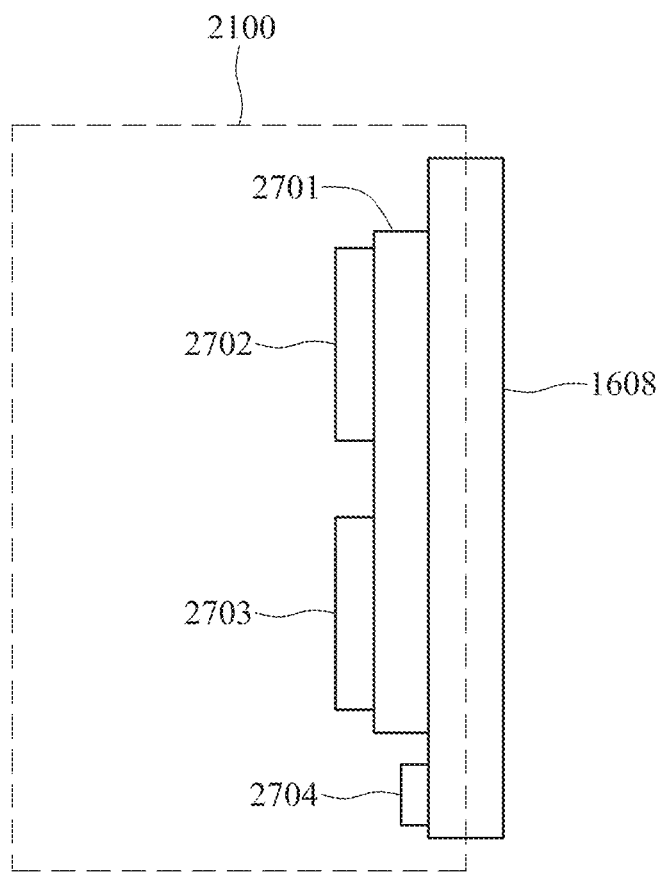
FIG. 27 is a schematic illustration of internal area 2100 of FIG. 21.

Referring to FIG. 27, vehicle locking boot 1600 may incorporate an alarm system. In exemplary embodiments, the vehicle locking boot 1600 includes a circuit board 2701 (e.g., a printed circuit board (PCB) connected with or in communication with (e.g., via a wired or ireless connection) keypad assembly 1608. The alarm system may include a sensor 2702 and a sound generating device 2703, each of which may be controlled by the circuit board 2701. Each of the sensor 2702 and a sound generating device 2703 may be connected with the circuit board 2701 by a wired connection, a wireless connection, or by being directly mounted on the circuit board 2701. The sensor 2702 is configured to detect at least one of vibration, movement, or acceleration of the vehicle locking boot 1600 and cause an audible sound to be emitted by the sound generating device 2703 if the vehicle locking boot 1600 is moved with respect to a vehicle wheel, such as prior to the proper code being entered on the keypad assembly 1608 to release the vehicle locking boot 1600 from a vehicle.

The PCB provides a mechanical and electrical foundation for connecting and supporting various electronic components. The PCB may include a non-conductive substrate with conductive pathways etched or printed on its surface, facilitating electrical connections between the components mounted on the board. The PCB may include single-layer, double-layer, or multi-layer configurations, depending on the complexity and requirements of the electronic circuit.

The sensor 2702 may be or may include at least one of an accelerometer, a gyroscope, a piezoelectric vibration sensor, a micro-electro-mechanical systems (MEMS) vibration sensor, an optical motion sensor, a seismic sensor, a capacitive proximity sensor, or a laser doppler vibrometer.

The sound generating device 2703 may be or may include a speaker, a buzzer, or a horn. The sound generating device 2703 may be or may include at least one of a piezoelectric buzzer, an electromagnetic speaker, a piezoelectric sounder, and electromechanical transducer (e.g., a solenoid), an acoustic resonator, or a thermal acoustic device.

The keypad assembly 1608, circuit board 2701, sensor 2702, sound generating device 2703 may each be powered by a battery 2704, such as a rechargeable battery, or a replaceable battery. As an example, the battery may be lithium ion battery, a lithium thionyl chloride (Li—$SOCl_2$) battery, a lithium manganese dioxide (Li—$MnO_2$) battery, a lithium iron phosphate ($LiFePO_4$) battery, a nickel metal hydride (NiMH) battery, an alkaline battery, a zinc-air battery, or a solid-state battery. The above-noted exemplary batteries may similarly be employed by any of the electrical systems (e.g., the GPS system) described herein.

In use, the vehicle locking boot 1600 is secured to a wheel/tire of a vehicle to disable the vehicle by mechanically maneuvering the vehicle locking boot 1600, locking the vehicle locking boot 1600 to the wheel/tire, and activating the keypad assembly 1608, such that a particular code must be entered on the keypad assembly 1608 to release the vehicle locking boot 1600. If the vehicle locking boot 1600 is moved or tampered without prior to entering the particular unlock code on the keypad assembly 1608, such movement is detected by the sensor 2702, and a loud audible alarm will sound by projecting sound through the sound generating device 2703, such that people in the vicinity of the boot can hear the alarm. As an example, tilting the boot to a different angle with respect to the ground, vibrating the boot, or shaking the boot may trigger the audible alarm.

The alarm may sound for a predetermined period of time, or the alarm may continue to sound until it is deactivated by entering the release code or another deactivation code in the keypad assembly 1608.

The keypad assembly 1608 may be configured to have its release code changed in various ways. For example, the keypad assembly 1608 may be configured to operate with a rolling release code that is changed periodically. A rolling release code refers to a predetermined list of codes that are activated serially and in a predetermined order. In one exemplary embodiment, the release code is changed upon every deactivation (e.g., to the next code in the rolling release code sequence). In another exemplary embodiment, the release code is automatically changed at a particular time of day (e.g., the release code may be set to the next code in the rolling release code sequence at midnight every night, such that the release code is different every day).

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A vehicle locking boot, comprising:
 a horizontal support arm, wherein the horizontal support arm defines a horizontal axis extending along the horizontal support arm, wherein the horizontal support arm includes a thermoplastic polymer;
 a track formed in the horizontal support arm, wherein the track extends along the horizontal axis defined by the horizontal support arm;
 a first vertical support arm extending from the horizontal support arm substantially along a direction orthogonal to an upper surface of the horizontal support arm, wherein the first vertical support arm comprises a front engagement protrusion extending therefrom, wherein the first vertical support arm includes the thermoplastic polymer;
 a receiving orifice defined in the horizontal support arm and extending along a direction substantially parallel to an extending direction of the horizontal support arm;
 a horizontal extension portion coupled to the track formed in the horizontal support arm, wherein the horizontal extension portion is configured to be slidably received in the receiving orifice by sliding horizontally along the track formed in the horizontal support arm;
 a second vertical support arm extending from the horizontal extension portion substantially along the direction orthogonal to the upper surface of the horizontal support arm, wherein the second vertical support arm comprises a rear engagement protrusion extending therefrom, wherein the second vertical support arm includes the thermoplastic polymer;

a lug nut blocking plate extending from the first vertical support arm above the front engagement protrusion, wherein the lug nut blocking plate includes the thermoplastic polymer; and the thermoplastic polymer includes polypropylene and fiberglass, wherein the thermoplastic polymer is at least 85% polypropylene.

2. The vehicle locking boot of claim 1, further including:
a first rear surface defined by the first vertical support arm;
a second rear surface defined by the lug nut blocking plate;
a plurality of first interconnected support walls extending substantially along a direction orthogonal to the first rear surface of the first vertical support arm, wherein the first interconnected support walls of the plurality of first interconnected support walls are configured to increase a rigidity of the first vertical support arm; and
a plurality of second interconnected support walls extending substantially along a direction orthogonal to the second rear surface of the lug nut blocking plate, wherein the second interconnected support walls of the plurality of second interconnected support walls are configured to increase a rigidity of the lug nut blocking plate.

3. The vehicle locking boot of claim 1, wherein the horizontal support arm, the first vertical support arm, and the lug nut blocking plate are a single integrally formed structure.

4. The vehicle locking boot of claim 1, wherein the thermoplastic polymer includes discontinuous fibers having at most 15% fiberglass.

5. The vehicle locking boot of claim 1, wherein the second vertical support arm includes a base member connected with the horizontal extension portion and a vertical extension portion supporting the rear engagement protrusion, wherein the base member defines a first width greater than a second width defined by the vertical extension portion.

6. The vehicle locking boot of claim 5, wherein the base member of the second vertical support arm defines a first angled sidewall, a second angled sidewall, and a third angled sidewall.

7. The vehicle locking boot of claim 6, wherein the base member includes a first vertical sidewall extending from the first angled sidewall, a second vertical sidewall extending from the second angled sidewall, and a third vertical sidewall extending from the third angled sidewall.

8. The vehicle locking boot of claim 1, wherein the first vertical support arm includes a vertical extension portion, a first angled sidewall extending between the horizontal support arm and the vertical extension portion, and a second angled sidewall extending between the lug nut blocking plate and the vertical extension portion.

9. The vehicle locking boot of claim 1, further including:
a recess defined in the first vertical support arm, wherein the recess is defined by a first inner sidewall of the first vertical support arm and a second inner sidewall of the first vertical support arm; and
a keypad assembly arranged in the recess defined in the first vertical support arm, wherein the keypad assembly defines a first outward facing sidewall configured to face the first inner sidewall of the first vertical support arm, and wherein the keypad assembly defines a second outward facing sidewall configured to face the second inner sidewall of the first vertical support arm.

10. The vehicle locking boot of claim 1, further including:
a compartment defined in the first vertical support arm, wherein the compartment is configured to house a global positioning system module therein; and
a compartment cover configured to be removably coupled with the lug nut blocking plate or the first vertical support arm to close the compartment.

11. The vehicle locking boot of claim 10, further including:
at least two orifices formed in a wall of the compartment; and
at least two projections extending from the compartment cover, wherein each projection of the at least two projections is configured to be received in a corresponding orifice of the at least two orifices to prevent lateral movement of the compartment cover with respect to the compartment.

12. The vehicle locking boot of claim 1, wherein the lug nut blocking plate comprises a lug nut blocking pad disposed on lug nut blocking plate.

13. The vehicle locking boot of claim 1, wherein the lug nut locking plate defines an octagonal shape.

14. The vehicle locking boot of claim 1, wherein the horizontal extension portion is configured to slide along the track to move the rear engagement protrusion to varying distances from the front engagement protrusion.

15. The vehicle locking boot of claim 1, wherein the first vertical support arm forms a 90° angle with the horizontal support arm.

16. The vehicle locking boot of claim 1, wherein the front engagement protrusion faces the rear engagement protrusion.

17. The vehicle locking boot of claim 1, wherein the front engagement protrusion is substantially horizontally aligned with the rear engagement protrusion.

18. The vehicle locking boot of claim 1, further including a keypad disposed in the first vertical support arm.

19. The vehicle locking boot of claim 1, wherein the horizontal extension portion is configured to slide horizontally along the track below the first vertical support arm.

* * * * *